(12) United States Patent
Garg et al.

(10) Patent No.: US 12,482,449 B2
(45) Date of Patent: Nov. 25, 2025

(54) SYSTEMS AND METHODS FOR USING SILENT SPEECH IN A USER INTERACTION SYSTEM

(71) Applicant: Wispr AI, Inc., San Francisco, CA (US)

(72) Inventors: Sahaj Garg, San Francisco, CA (US); Tanay Kothari, San Francisco, CA (US); Anthony Leonardo, Broadlands, VA (US)

(73) Assignee: Wispr AI, Inc., San Francisco, CA (US)

( * ) Notice: Subject to any disclaimer, the term of this patent is extended or adjusted under 35 U.S.C. 154(b) by 277 days.

(21) Appl. No.: 18/338,749

(22) Filed: Jun. 21, 2023

(65) Prior Publication Data

US 2024/0221738 A1    Jul. 4, 2024

Related U.S. Application Data

(60) Provisional application No. 63/437,088, filed on Jan. 4, 2023.

(51) Int. Cl.
   *G10L 13/027*    (2013.01)
   *G06F 3/01*      (2006.01)
   (Continued)

(52) U.S. Cl.
   CPC ............ *G10L 13/027* (2013.01); *G06F 3/011* (2013.01); *G06F 3/012* (2013.01); *G06F 3/015* (2013.01);
   (Continued)

(58) Field of Classification Search
   CPC ... G10L 13/027; G10L 13/033; G10L 13/047; G10L 15/18; G10L 15/22;
   (Continued)

(56) References Cited

U.S. PATENT DOCUMENTS

| 8,082,149 B2 | 12/2011 | Schultz et al. |
| 9,013,264 B2 | 4/2015 | Parshionikar et al. |

(Continued)

FOREIGN PATENT DOCUMENTS

| CA | 2 923 979 A1 | 3/2014 |
| CA | 2 942 852 A1 | 9/2014 |

(Continued)

OTHER PUBLICATIONS

Gaddy et al., An Improved Model for Voicing Silent Speech. Proceedings of the 59th Annual Meeting of the Association for Computational Linguistics and 11th International Joint Conference on Natural Language Processing. Aug. 1-6, 2021. pp. 175-181.

(Continued)

*Primary Examiner* — Eric Yen
(74) *Attorney, Agent, or Firm* — Wolf, Greenfield & Sacks, P.C.

(57) ABSTRACT

The techniques described herein relate to computerized methods and systems for integrating with a knowledge system. In some embodiments, a user interaction system may include a speech input device wearable on a user and configured to receive an electronic signal indicative of a user's speech muscle activation patterns when the user is speaking. In some embodiments, the electronic signal may include EMG data received from an EMG sensor on the speech input device. The system may include at least one processor configured to use a speech model and the electronic signal as input to the speech model to generate a text prompt. The at least one processor may use a knowledge system to take an action or generate a response based on the text prompt. In some embodiments, the system may provide context to the knowledge system.

31 Claims, 17 Drawing Sheets

(51) Int. Cl.
*G06N 3/092* (2023.01)
*G06N 20/00* (2019.01)
*G10L 13/033* (2013.01)
*G10L 13/047* (2013.01)
*G10L 15/18* (2013.01)
*G10L 15/22* (2006.01)
*G10L 15/24* (2013.01)
*G10L 15/25* (2013.01)
*G10L 19/012* (2013.01)
*G10L 19/04* (2013.01)
*G10L 25/18* (2013.01)
*G10L 25/78* (2013.01)

(52) U.S. Cl.
CPC ............ *G06F 3/017* (2013.01); *G06N 3/092* (2023.01); *G06N 20/00* (2019.01); *G10L 13/033* (2013.01); *G10L 13/047* (2013.01); *G10L 15/18* (2013.01); *G10L 15/22* (2013.01); *G10L 15/24* (2013.01); *G10L 15/25* (2013.01); *G10L 19/012* (2013.01); *G10L 19/04* (2013.01); *G10L 25/18* (2013.01); *G10L 25/78* (2013.01); *G06F 2203/011* (2013.01); *G10L 2015/223* (2013.01)

(58) Field of Classification Search
CPC ... G10L 2015/223; G10L 15/24; G10L 15/25; G10L 19/012; G10L 19/04; G10L 25/18; G10L 25/78; G06N 3/092; G06N 20/00; G06F 3/011; G06F 2203/011; G06F 3/012; G06F 3/015; G06F 3/017
See application file for complete search history.

(56) References Cited

U.S. PATENT DOCUMENTS

| | | | | |
|---|---|---|---|---|
| 10,684,686 | B1* | 6/2020 | Milstein | G06F 3/015 |
| 10,878,818 | B2 | 12/2020 | Kapur et al. | |
| 11,709,548 | B2 | 7/2023 | Tadi et al. | |
| 2002/0077534 | A1* | 6/2002 | DuRousseau | G06F 3/015 600/595 |
| 2012/0290950 | A1 | 11/2012 | Rapaport et al. | |
| 2015/0086052 | A1 | 3/2015 | Park et al. | |
| 2015/0161998 | A1* | 6/2015 | Park | G10L 15/24 704/231 |
| 2015/0288944 | A1* | 10/2015 | Nistico | G06F 3/0487 345/156 |
| 2016/0314781 | A1 | 10/2016 | Schultz et al. | |
| 2017/0131768 | A1 | 5/2017 | Budavari et al. | |
| 2018/0239956 | A1 | 8/2018 | Tadi et al. | |
| 2019/0074012 | A1* | 3/2019 | Kapur | A61B 5/682 |
| 2019/0118834 | A1* | 4/2019 | Wiebel-Herboth | B60W 30/0953 |
| 2020/0258535 | A1 | 8/2020 | Vatanparav et al. | |
| 2020/0289016 | A1* | 9/2020 | Lukyanenko | G06F 3/017 |
| 2021/0124422 | A1 | 4/2021 | Forsland | |
| 2021/0183383 | A1 | 6/2021 | Volovich et al. | |
| 2022/0137702 | A1 | 5/2022 | Min et al. | |
| 2022/0160296 | A1 | 5/2022 | Rahmani et al. | |
| 2022/0187912 | A1 | 6/2022 | Alcaide et al. | |
| 2022/0208194 | A1* | 6/2022 | Rameau | A61B 5/296 |
| 2022/0342477 | A1* | 10/2022 | Ross | G06F 3/167 |
| 2023/0077010 | A1 | 3/2023 | Zhang et al. | |
| 2023/0078978 | A1 | 3/2023 | Tadi et al. | |
| 2023/0130770 | A1 | 4/2023 | Miller et al. | |
| 2023/0157757 | A1 | 5/2023 | Braido et al. | |
| 2023/0157762 | A1 | 5/2023 | Braido et al. | |
| 2024/0220016 | A1 | 7/2024 | Garg et al. | |
| 2024/0220811 | A1 | 7/2024 | Garg et al. | |
| 2024/0221718 | A1 | 7/2024 | Kothari et al. | |
| 2024/0221719 | A1 | 7/2024 | Kothari et al. | |
| 2024/0221738 | A1 | 7/2024 | Garg et al. | |
| 2024/0221741 | A1 | 7/2024 | Kothari et al. | |
| 2024/0221751 | A1 | 7/2024 | Garg et al. | |
| 2024/0221753 | A1 | 7/2024 | Garg et al. | |
| 2024/0221762 | A1 | 7/2024 | Garg et al. | |
| 2025/0061885 | A1 | 2/2025 | Garg et al. | |

FOREIGN PATENT DOCUMENTS

| | | | |
|---|---|---|---|
| CA | 2 986 87 | A1 | 5/2018 |
| CA | 2998687 | A1 * | 5/2018 ........... A61B 5/1128 |
| CA | 3 164 001 | A1 | 7/2021 |
| CA | 2 942 852 | C | 3/2023 |
| CA | 2 957 766 | C | 10/2023 |
| CN | 101902960 | A | 12/2010 |
| CN | 112424859 | A | 2/2021 |
| CN | 114703091 | A | 7/2022 |
| KR | 10-2015-0104345 | A | 9/2015 |
| KR | 10-2020-0127150 | A | 11/2020 |
| WO | WO 2019/040669 | A1 | 2/2019 |
| WO | WO 2022/020968 | A1 | 2/2022 |
| WO | WO 2022/245833 | A2 | 11/2022 |

OTHER PUBLICATIONS

Gaddy et al., Digital Voicing of Silent Speech. arXiv:2010.02960v1 [eess.AS] Oct. 6, 2020. 10 pages.

He et al., Unvoiced Speech Recognition Algorithm Based on Myoeletric Signal. ICMLC. Feb. 15-17, 2020. 7 Pages.

Herff et al., Impact of Different Feedback Mechanisms in EMG-based Speech Recognition. Interspeech. Aug. 28-31, 2011:2213-2216.

Ishak., Speaker Identification Based on Vocal Cords Vibrations signal: Effect of the Window. International Journal of Digital Information and Wireless Communications. Jan. 2018. Doi:10.17781/P002406. 6 Pages.

Jamil et al., A flexible Speech Recognition System for Cerebral Palsy Disabled. ICIEIS. 2011. pp. 42-55.

Jou et al., Articulatory Feature Classification Using Surface Electromyography. International Central for Advanced Technologies. IEEE. 2006. 4 Pages.

Jou et al., Towards Continuous Speech Recognition Using Surface Electromyography. Interspeech. Sep. 17-21, 2006. 4 Pages.

Kapur et al., Alterego: A Personalized Wearable Silent Speech Interface. Session 1B: Multimodel Interfaces. IUI. Mar. 5, 2018. 11 Pages.

Kapur, How AI Could Become an Extension of your mind. TED. YouTube. Jun. 6, 2019.

Karnjanedecha et al., Signal Modeling for High-Performance Robust Isolated Word Recognition. IEEE Transactions of Speech and Audio Processing. Sep. 2001;9(6):647-654.

Maier-Hein et al., Session Independent Non-Audible Speech Recognition Using Surface Electromyography. IEEE Workshop on Automatic Speech Recognition and Understanding. 2005. 6 Pages.

Maier-Hein, Speech Recognition Using Surface Electromyography. Diplomarbeit Thesis. Aug. 2005. 129 Pages.

Manabe et al., Unvoiced Speech Recognition using EMG—Mime Speech Recognition—. Short Talk: Brains, Eyes and Ears. CHI. Apr. 5-10, 2003. 2 Pages.

Meltzner et al., Development of sEMG sensors and algorithms for silent speech recognition. J Neural Eng. Aug. 2018;15(4):046031. doi: 10.1088/1741-2552/aac965. Epub Jun. 1, 2018. PMID: 29855428; PMCID: PMC6168082.

Meltzner et al., Silent Speech Recognition as an Alternative Communication Device for Persons with Laryngectomy. IEEE/ACM Trans Audio Speech Lang Process. Dec. 2017;25(12):2386-2398. doi: 10.1109/TASLP.2017.2740000. Epub Nov. 28, 2017. PMID: 29552581; PMCID: PMC5851476.

Polur et al., experiments with Fast Fourier Transform, Linear Predictive and Cepstral Coefficients in Dysarthric Speech Recognition Algorithms Using Hidden Markov Model. IEEE Transactions on Neural Systems and Rehabilitation Engineering. Dec. 2005;13(4):558-561.

Prajapati et al., A Survey on Isolated Word and Digit Recognition Using Different Techniques. International Journal of Computer Applications (0975-8887). Mar. 2017; 161(3). 10 Pages.

(56) References Cited

OTHER PUBLICATIONS

Purcher, Apple Invents a next-generation AirPods Sensor System that could measure Biosignals and Electrical Activity of a user's Brain. Jul. 20, 2023. 9 pages. https://www.patentlyapple.com/2023/07/apple-invents-a-next-generation-airpods-sensor-system-that-could-measure-biosignals-and-electrical-activity-of-a-users-brain.html [Last Accessed Aug. 21, 2023].
Rajasekaran et al., Recognition of Speech Under Stress and In Noise. ICASSP. 1986. 4 Pages.
Schultz et al., Modeling coarticulation in EMG-based continuous speech recognition. ScienceDirect. Speech Communications 52 (2010). Dec. 2, 2009. 13 Pages.
Toruk et al., Short Utterance Speaker Recognition Using Time-Delay Neural Network. 16th International Multi-Conference on Systems, Signals & Devices (SSD'19). 2019. 4 Pages.
Wand et al., The EMG-UKA for Electromyographic Speech Processing. Interspeech. Sep. 14-18, 2019. 5 Pages.
Wand et al., Towards Speaker-Adaptive Speech Recognition Based on Surface Electromyography. ICBSSP. 2009. 8 Pages.
Wand, Advancing Electromyographic Continuous Speech Recognition. Signal Preprocessing and Modeling. Scientific Publishing. Jan. 14, 2014. 256 Pages.
Wand, Speaker-Adaptive Speech Recognition Based on Surface Electromyography. IJCBEST. 2009. 15 Pages.
Wand, Towards Real-life Application of EMG-based Speech Recognition by using Unsupervised Adaptation. Interspeech. Sep. 14-18, 2014. 5 Pages.
Zhou et al., Improved Phoneme-Based Myoelectric Speech Recognition. IEEE Transactions on Biomedical Engineering. Aug. 2009;56(8). 8 Pages.
International Search Report and Written Opinion dated Apr. 26, 2024, in connection with International Application No. PCT/US24/10268.

\* cited by examiner

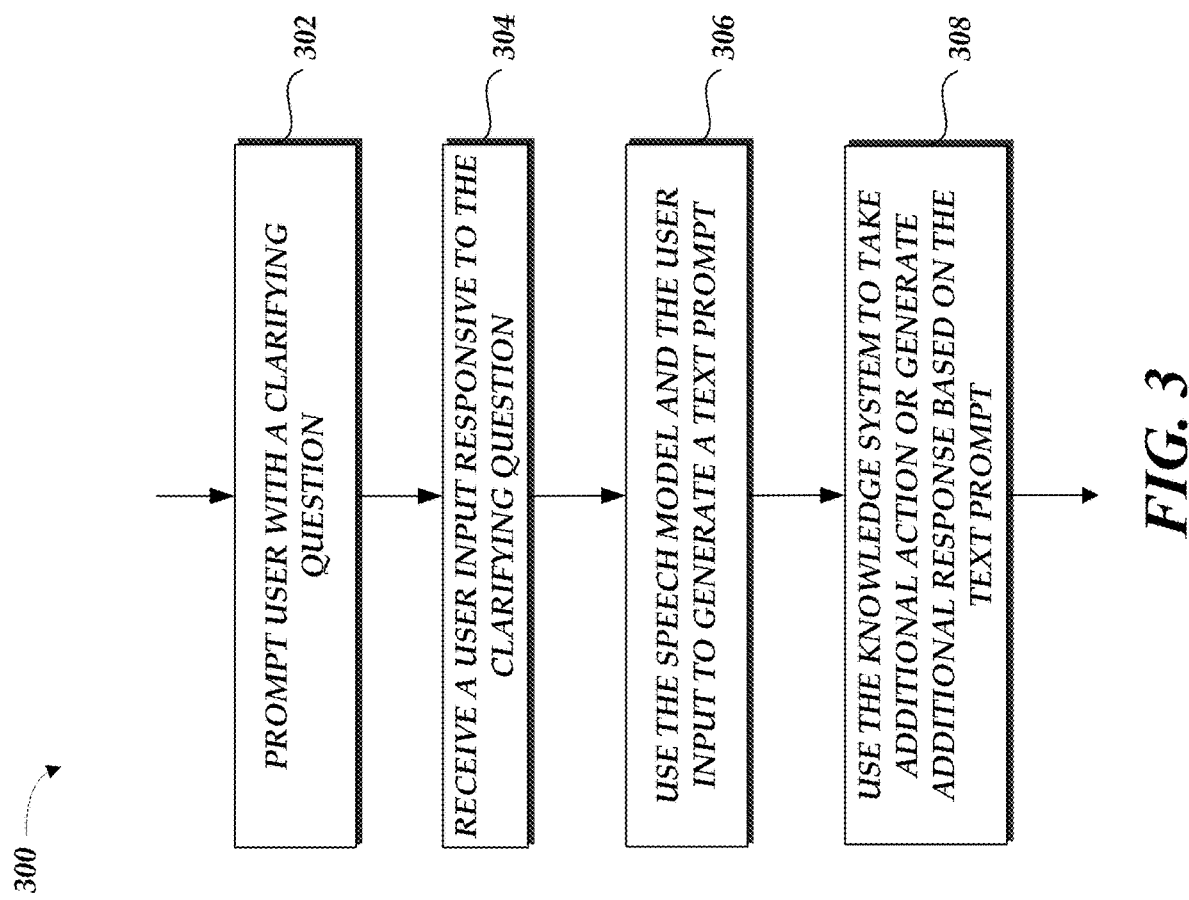

SYSTEMS AND METHODS FOR USING SILENT SPEECH IN A USER INTERACTION SYSTEM

CROSS-REFERENCE TO RELATED APPLICATIONS

This application claims the benefit under 35 U.S.C. § 119(e) of U.S. Provisional Application No. 63/437,088, entitled "SYSTEM AND METHOD FOR SILENT SPEECH DECODING," filed Jan. 4, 2023, the entire contents of which are incorporated herein by reference.

FIELD

This technology relates to interaction systems and methods, and more particularly to systems and methods for using silent speech in a user interaction system.

BACKGROUND

An interaction system may employ a large language model trained to respond to a user's prompt via natural language. Conventional interaction systems generally ask a user to enter a text prompt in a single modality, such as text input via a keyboard.

SUMMARY

The inventors have recognized and appreciated that conventional user interaction systems are unable meet the real-world needs of users. For example, it is not always practical for a user to enter text with a keyboard. Also, some existing systems accept user's voice as input to the systems. However, voice-based systems may not always be practical when the environment has noise (e.g., in a public place, in an office etc.) or privacy is of concern.

Accordingly, the inventors have developed techniques that, in some embodiments, provide a user interaction system including: a wearable speech input device configured to measure a signal indicative of a user's speech muscle activation patterns when the user is speaking; and at least one processor. The at least one process is configured to: use a speech model and the signal as an input to the speech model to generate an output; and use a knowledge system to take an action or generate a response based on the output. In some examples, the speech input device includes an electromyography (EMG) sensor, and the signal is an EMG signal captured from the EMG sensor when the user is silently speaking.

In some embodiments, the techniques provide a computerized method that includes: receiving a signal indicative of a user's speech muscle activation patterns when the user is speaking; using a speech model and the signal as an input to the speech model to generate an output; and using a knowledge system to take an action or generate a response based on the output. In some examples, receiving the signal indicative of the user's speech muscle activation patterns when the user is speaking comprises: receiving the signal from a speech input device including an electromyography (EMG) sensor; wherein the signal is an EMG signal captured from the EMG sensor when the user is silently speaking.

In some embodiments, the techniques provide a non-transitory computer-readable media comprising instructions that, when executed by one or more processors on a computing device, cause the one or more processors to: receive a signal indicative of a user's speech muscle activation patterns when the user is speaking; use a speech model and the signal as an input to the speech model to generate an output; and use a knowledge system to take an action or generate a response based on the output. In some examples, receiving the signal indicative of the user's speech muscle activation patterns when the user is speaking comprises: receiving the signal from a speech input device including an electromyography (EMG) sensor; wherein the signal is an EMG signal captured from the EMG sensor when the user is silently speaking.

Still other aspects, examples, and advantages of these exemplary aspects and examples, are discussed in detail below. Moreover, it is to be understood that both the foregoing information and the following detailed description are merely illustrative examples of various aspects and examples and are intended to provide an overview or framework for understanding the nature and character of the claimed aspects and examples.

Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments and are incorporated in and constitute a part of this specification but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 3 is a flow diagram of an example process that may be implemented in an interaction system to take additional action or generate additional response based on a user prompt responsive to a clarifying questions, according to some embodiments.

DETAILED DESCRIPTION

Figure 1:
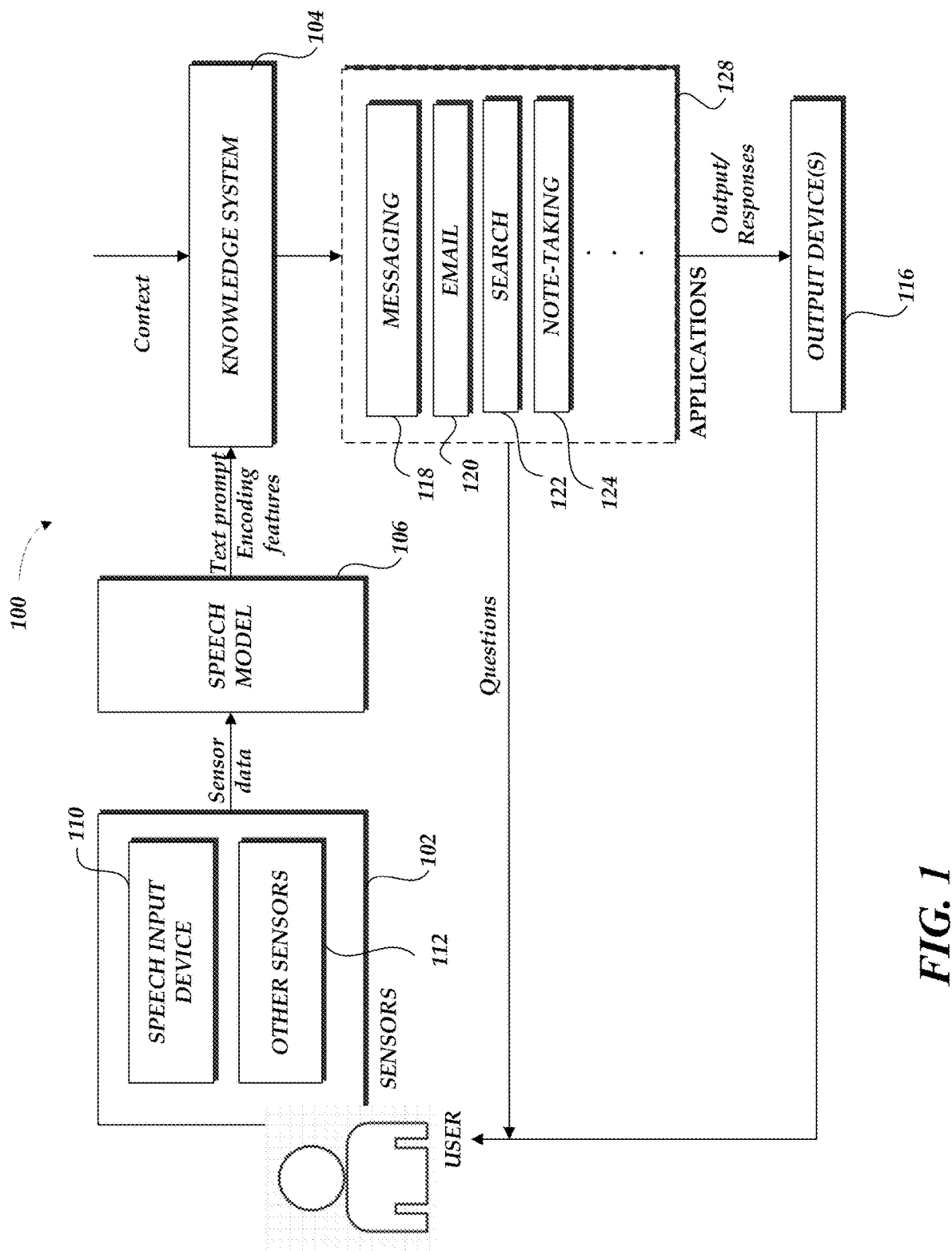
FIG. 1 is a diagram of an example interaction system, according to some embodiments.

For the purposes of promoting an understanding of the principles of the present disclosure, reference will now be made to the embodiments illustrated in the drawings, and specific language will be used to describe the same. It will nevertheless be understood that no limitation of the scope of the invention is thereby intended.

A traditional interaction system may employ a large language model trained to respond to a user's prompt via natural language. The traditional interaction system generally asks a user to enter a text prompt in a single modality, such as text input via a keyboard. The inventors have recognized and appreciated that conventional interaction systems are unable meet the real-world needs of users. For example, it is not always practical for a user to enter text with a keyboard. Some existing systems accept user's voice as input to the systems. However, voice-based systems may not always be practical when the environment has noise (e.g., in a public place, in an office etc.) or privacy is of concern, or speaking aloud is simply unpleasant to the user.

To solve the above described technical problems and/or other technical problems, the inventors have recognized and appreciated that silent speech or sub-vocalized speech may be particularly useful in providing a prompt for an interaction system. In the interaction system, users may speak to the system via silent speech or whisper to the system in a low voice. The system could enable users to effectively enter a prompt by speech (e.g., silent speech) but does not have the drawbacks associated with voice-based systems.

Accordingly, the inventors have developed new technologies for interacting with an interaction system, which may employ a large language model. Described herein are various techniques, including systems, computerized methods, and non-transitory instructions, that are configured to use silent speech or whisper to query a large language model (LLM). A LLM may be a system trained on large amount of data to receive a prompt and iteratively predict the next character in a string of characters in response to the prompt. The prompt may include one or more modalities such as text, audio, video, or other suitable modalities.

Techniques are provided that form a prompt for a knowledge system using silent speech. Examples of silent speech may include silent or sub-vocalized speech, which has a volume less than a volume threshold. For example, silent speech may include speaking silently, or minimally articulating (e.g., contraction of the speech articulator muscles in a way that is associated with producing the speech, but with minimal to no vocal fold vibration or sound production). In some embodiments, the techniques may include a (silent) speech model configured to convert an electrical signal generated from a speech input device to a text prompt, where the electrical signal may be indicative of a user's speech muscle activation patterns when the user is speaking (silently or with voice). The speech input device may be a wearable device.

Techniques are also provided that include novel approaches in which a speech model may be trained and configured to convert an electrical signal indicative of a user's speech muscle activation patterns when the user is speaking, to a text prompt. In some embodiments, the user may be speaking silently or sub-vocally (e.g., when sound volume is below a respective volume threshold). The electrical signal may include electromyography (EMG) data that can be used to indicate the user's speech muscle activation patterns. The speech model may be used to formulate the prompt to improve the interaction with the knowledge system. In some embodiments, the techniques are provided that also use one or more additional sensors to capture other sensor data (e.g., voice data) when the user is speaking. The other sensor data may be combined with the EMG data to improve the accuracy of the generated prompt. For example, the user may be speaking vocally, where both EMG data (which indicate the user's speech muscle activation patterns) and the voice data (which represents the sound wave of the user's vocalized speech) are captured and provided to the speech model to generate the prompt.

In some embodiments, the techniques may include providing the prompt to the knowledge system to take an action or generate a response. In some embodiments, the knowledge system may be configured to interact with one or more applications to take the action or generate the response. Examples of the one or more applications include messaging, email, search, note-taking, and/or other suitable application that can use the silent speech. For example, when interacting with a messaging system, the response from the knowledge system may include a message generated by the messaging system based on the prompt that is provided to the knowledge system. Examples of responses may also include an email message generated in an email application, notes generated in a note-taking application, etc. The one or more applications are described in detail further herein.

In some embodiments, the techniques are provided that also provide context to the knowledge system to improve the accuracy of the output of the knowledge system. This may be advantageous when, for example, the input text prompt may be provided by a noisy, potentially error-prone transcription system. In some embodiments, the context may be associated with the environment in which the electronic signal indicative of the user's speech muscle activation patterns is collected when the user is speaking. The environment context may be obtained from one or more sensors. For example, the context may include the location of the user (via a GPS sensor), the image(s) of the environment in which the user is speaking (e.g., in a public place, in an office), via a camera. Various context may also be provided depending on the applications. For example, the context may include personalized characteristics of the user, e.g., a text messaging style based on the recipient user, and a carbon copy (cc) list of an email based on the content of the email.

The techniques described herein may provide advantages over conventional interaction systems in enabling users to enter prompts silently or in a sub-vocalized speech. The techniques described herein may also use one or more additional sensors to improve the accuracy of silent speech detection. Furthermore, the context provided to the knowledge system provide advantages in improved accuracy of the knowledge system and/or one or more applications with which the knowledge system interacts.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

FIG. 1 is a diagram of an example interaction system 100, according to some embodiments. System 100 may include one or more input sensors 102 configured to capture sensor data indicating the user's speech muscle activation patterns when a user is speaking or other sensor data associated with a user speaking. System 100 may include a speech model 106 configured to generate output (e.g., a text prompt or encoded features) based on the sensor data. System 100 may include a knowledge system 104 configured to receive the output from the speech model 106 to take action or generate a response.

System 100 may include one or more output devices 116 configured to output the responses from the knowledge system 104. In some embodiments, the knowledge system 104 is configured to interact with one or more applications 126 to take the action or generate the response. For example, the one or more applications may include a messaging system 118, an email system 120, a search system 122, a note-taking system 124, and/or other applications. These applications and other applications will be described in detail further herein.

With further reference to FIG. 1, in some embodiments, the one or more input sensors 102 may capture the sensor data when the user is speaking. Speaking may include articulation/speech at various levels. For example, the input speech associated with speaking may be a vocal (e.g., voiced) speech, a silent speech, a sub-vocalized speech (e.g., whispered speech) or a combination thereof. In some embodiments, vocal speech may refer to a vocal mode of phonation in which the vocal cords vibrate during at least part of the speech for vocal phonemes, creating audible turbulence during speech. In a non-limiting example, vocal speech may have a volume above a volume threshold (e.g., 40 dB when measured 10 cm from the user's mouth). In some examples, silent speech may refer to unvoiced mode of phonation in which the vocal cords are abducted so that they do not vibrate, and no audible turbulence is created during speech. Silent speech may occur at least in part while the user is inhaling, and/or exhaling. Silent speech may occur in a minimally articulated manner, for example, with visible movement of the speech articulator muscles, or with limited to no visible movement, even if some muscles such as the tongue are contracting. In a non-limiting example, silent speech have a volume below a volume threshold (e.g., 30 dB when measured about 10 cm from the user's mouth). In some examples, whispered speech may refer to unvoiced mode of phonation in which the vocal cords are abducted so that they do not vibrate, where air passes between the arytenoid cartilages to create audible turbulence during speech.

In some embodiments, the one or more sensors 102 may be configured to capture signals indicative of speech muscle activation patterns when the user is speaking. For example, the one or more sensors 102 may include one or more EMG sensor(s) configured to measure the electromyographic activity signals of nerves which innervate muscles when the user is speaking. In some examples, the one or more sensors 102 may include accelerometer(s) configured to measure the movement of a body part of the user resulting from the speech muscle activation (e.g., facial muscle movement, neck muscle movement etc.) associated with the user speaking. In some examples, the one or more sensors 102 may include optical sensor(s), e.g., photoplethysmography (PPG) sensor, which may be configured to measure the blood flow that occurs as a result of the speech muscle activation associated with the user speaking. In some examples, the one or more sensors 102 may include ultrasound sensor(s) configured to generate signals that may be used to infer the position of a specific muscle, such as the tongue within the oral cavity associated with the user speaking. In some examples, the one or more sensors 102 may include optical sensor(s) (e.g., a camera) configured to capture the visible movement of muscles on a body part of the user (e.g., a face, lips) associated with the user speaking.

In some embodiments, at least a portion of the one or more sensors 102 may be installed in a speech input device 110. In some embodiments, the speech input device may be a wearable device that is wearable on a user and configured to measure a signal indicative of the user's speech muscle activation patterns when the user is speaking. For example, the speech input device 110 may include an EMG sensor configured to capture the signal indicative of the user's speech muscle activation patterns as described above and further herein when the user is speaking.

In some embodiments, the speech input device 110 may include a conductive electrode coupled to an electronic amplifier system and configured to record signals indicative of the user's speech muscle activation patterns non-invasively from one or more regions of the face and/or neck of the user. For example, the conductive electrode may include one or more EMG sensors configured to be in touch with the user's face and/or neck to record the signals when the user is speaking. Additionally, and/or alternatively, the conductive electrode may include any other suitable sensor(s).

In some embodiments, the speech input device 110 may include an optical sensor, e.g., a camera as described above and further herein, which is placed within a head-worn wearable and positioned to face the body part. For example, the wearable device may be glasses such as a AR glasses or a headset such as a VR or mixed reality headset.

In some embodiments, the one or more sensors 102 may include one or more additional sensors 112 configured to generate respective electronic signals when the user is speaking. For example, the one or more additional sensors 112 may include a voice capturing sensor, e.g., a microphone, configured to capture voice signal of the user when the user is speaking. In a non-limiting example, the one or more additional sensors 112 may include an image sensor positioned to face towards the user (e.g., positioned to capture at least a portion of user's face when the user is in front of the computer display) and configured to capture the user's speech muscle activation patterns when the user is speaking. Although it is shown in FIG. 1 that the one or more additional sensors 112 may be external to the speech input device 110, it is appreciated that any of the one or more additional sensors 112 may be installed in the speech input device 110. Similarly, any of the one or more sensors 102 may be external to the speech input device 110. As further shown in FIGS. 4A-13, various configurations of an speech input device and/or speech model installed therein are described.

With further reference to FIG. 1, in some embodiments, speech model 106 may be configured to convert the sensor data from the sensor(s) 102 to text prompt and provide the text prompt to the knowledge system 104. In some embodiments, the user may be speaking silently while the EMG data is recorded and provided to the speech model to generate text prompt, where the EMG data includes electronic signals indicative the user's speech muscle activation patterns associated with the user speaking. In generating the text prompt from the EMG data, the speech model 106 may be configured to use a trained speech model and the EMG data as input to the speech model to generate the text prompt. In some embodiments, the speech model may include a text classifier configured to predict the input signal at each time instance into one of a plurality of pre-trained classes. For example, each of the pre-trained classes may correspond to a letter on a keyboard. In some embodiments, each of the pre-trained classes may correspond to a phonemes, a byte pair, a word. In a non-limiting scenario, speech model 106 may generate the text prompt for the knowledge system 104 via simulating the keyboard input (e.g., letter by letter entry). For example, the user may speak letter by letter, the speech model 106 may convert the electronic signal captured at the sensor(s) 102 (e.g., EMG senor) from the user's speech muscle activation patterns for speaking each letter to a respective text (e.g., a letter). In some embodiments, the text (e.g., letter by letter) may be provided to the knowledge system 104 in lieu of keyboard input.

In some embodiments, the pre-trained classes in the text classifier may correspond to a plurality of words. Thus, the text prompt generated by the speech model may correspond to one or more words spoken by the user. In some embodiments, the text prompt generated by the speech model may correspond to an utterance of the user that comprises a subset of what the user spoke. For example, the utterance of the user may include one or more spoken words. In some embodiments, the text prompt generated by the speech model may include a single prediction of what the user spoke. For example, the single prediction may be a candidate prediction that has a highest rank (e.g., the highest probability) among all candidate predictions of text.

In some embodiments, the speech model may be configured to convert the sensor data from the sensor(s) 102 to generate encoded features as input to the knowledge system 104, where the encoded features may include information about the uncertainty of the text prompt. In some embodiments, the encoded features may include a probability distribution of different text tokens associated with a decoder of the speech model. In some non-limiting examples, the speech model 106 may include a neural network including a plurality of layers configured to encode features from the sensor data, where the probability distribution may be associated with different text tokens and may be produced by the last layer of the neural network in the speech model. In some non-limiting examples, the encoded features may be hidden state of one or more layers of the neural network. The probability distribution may be provided into a decoder in the speech model that turns that probability distribution into text (e.g., text prompt). For example, each of a plurality of text tokens in a text prompt may be associated with a respective probability. In some embodiments, the encoded features may be generated from an intermediate layer of the neural network, or any other suitable layer of the neural network. In some embodiments, the encoded features may include features from a pretrained neural network that is trained via self-supervision, without a text classifier.

In some non-limiting examples, the encoded features may include a probability distribution associated with a decoded text (e.g., a text prompt) after the decoding of text has happened. For example, the text prompt generated by the speech model may include two or more candidate transcripts of utterance of the user comprising one or more spoken words, which each candidate transcript may be associated with a respective probability.

In some embodiments, the knowledge system (e.g., 104) may use information (e.g., context) to account for the uncertainty information in the encoded features from the speech model. In some non-limiting examples, the speech model (e.g., 106) may generate text tokens each associated with a respective probability, for example, Let—100%; Cray—60%, Chris—40%; Know—100%; I'm—100%; Running—100%; Late—100%. To account for the uncertainty about Cray or Chris, the knowledge system may be provided with the context of the user's contact list and use the contact list. For example, the knowledge system may determine that Cray is not in the user's contact list and thus, whereas Chris is. Thus, the knowledge system may determine to use Chris for the text prompt or take action or generate a response using Chris.

In some non-limiting examples, the knowledge system may determine uncertainty in a text token and may ask a follow-up question to resolve the uncertainty. For example, the knowledge system may be uncertain as to whether a text token was "6 pm" or "7 pm." The knowledge system may prompt the user to either repeat the time, or directly output a follow-up question: "did you say 6 or 7"? In some embodiments, the knowledge system may determine that a word in the text prompt with uncertainty is not important, such as "a bit late" or "little late." In such case, the knowledge system may not ask a follow up question.

With further reference to FIG. 1, speech model 106 may be configured to receive silent speech and/or voiced speech to generate the output. In some embodiments, a voiced speech may be captured (e.g., via a microphone) when the user is speaking, where the voiced speech may also be used to improve the transcription of silent speech. In some non-limiting examples, the speech model may be configured to predict speech label in a first domain (e.g., silent speech), using at least in part training data in the first domain. Additionally, and/or alternatively, the speech model may be trained using at least in part training data in a second domain (e.g., voiced speech) different from the first domain. For example, the voiced speech training data may be used to train the speech model to predict the speech label with improved accuracy than predicting the speech label using the training data in the silent speech domain alone, as will be further illustrated herein.

In some non-limiting examples, a large data collection may be performed to gather training data, where data of subjects' vocalized speech in their everyday lives is collected. In some non-limiting examples, multi-modality pre-training may be combined with single-modality pre-training. For example, the collected data (e.g., the audio stream representing the vocalized speech, or the transcriptions thereof) may be used as labels for training the speech model to decode text in the silent speech domain. In some non-limiting examples, voiced speech training data may be used to calibrate the speech model to a specific user. For example, a model of a plurality of models may be selected based on the audio data and sensor data (e.g., EMG data).

With further reference to FIG. 1, in some embodiments, the speech model 106 may include a convolutional neural network (CNN), a transformer encoder, a transformer encoder-decoder, a hidden Markov model (HMM), or any other suitable statistical models. In some embodiments, the speech model 106 may be pre-trained using various methods. For example, the speech model may be trained as a sequence-to-sequence model configured to receive signals indicative of user's speech muscle activation patterns (e.g., EMG data) when the user is speaking and generate a text sequence. In some examples, the speech model may be trained as a connectionist temporal classification model, or a transducer model (e.g., recurrent neural network transducer). Details of the speech model and training thereof for silent speech are described in embodiments with respect to FIGS. 4A-13.

In some embodiments, the knowledge system 104 may be configured to take an action or generate a response based on the text prompt. With further reference to FIG. 1, knowledge system 104 is described in detail. In some embodiments, the knowledge system 104 may include a machine learning foundation model, which may be configured to perform generative prediction from unlabeled data via, for example, self-supervised learning. The machine learning foundation model may be adapted to a wide range of downstream tasks. In a non-limiting example, the machine learning foundation model may include a large language model, which may be configured to generate naturalistic text. In some embodiments, the large language model may be a generative language model which may be a (large) deep learning model that is configured predict the next token in a sequence of text given the previous tokens. In non-limiting examples, the knowledge system 104 may include a large language model developed by OpenAI's ChatGPT, or any other suitable large language models.

In some embodiments, the foundation model (e.g., large language model) in the knowledge system 104 may have a set of API calls (e.g., APIs for OpenAI plugins). System 100 may directly output text prompt (e.g., based on the output of the speech model 106) to the machine learning foundation model, which generates the executable code. System 100 may execute the generated executable code to cause one or more processors to take an action. For example, the code may be run in a suitable interpreter, e.g., a python interpreter, or a sandbox-ed virtual environment in the system 100. In some embodiments, the code may include API calls to the large language model to ensure security of the generated code.

In some embodiments, the knowledge system 104 may be fine-tuned to produce the code that conforms to a suitable API. For example, the system may include a large set of training examples of prompts and the respective code that should be generated according to a system API. The knowledge system 104 may be trained using the training examples to, for a given prompt (e.g., text prompt generated by the speech model 106), generate code for the API calls. In some embodiments, the machine learning foundation model may be trained for a small number of gradient steps using these training examples. In some embodiments, the foundation model may be trained to generate function calls that conform with an external API, such as OpenAPI specification or OpenAI plugins. In some examples, a code parser may be used to ensure that the generated code only includes calls to the allowable functions.

In some embodiments, the knowledge system may be configured in a variety of configurations to use the text prompt (e.g., from the speech model 106) as input and take an action or generate the response by sampling text from a distribution of possible actions/responses. For example, the knowledge system 104 may use cross attention or other suitable artificial intelligence (AI) model(s) to use other encoder features to improve the knowledge system. In some embodiments, the knowledge system 104 may be implemented as a computer program. In some embodiments, the knowledge system 104 may be at least in part implemented as a database. For example, the database may be provided with the text prompt (or keywords from the text prompt) as a query, such as the text prompt from the speech model 106, and perform a search based on the query to take the action or generate the response. In some embodiments, the knowledge system 104 may include a search engine to perform queries using the text prompt.

In some embodiments, the knowledge system 104 may include a vector database (where the text prompt is, at least in part, encoded into a vector embedding), which may be configured to use the vector embedding as a query to the database and search the vector database to take the action or generate the response. In performing the search, any suitable methods, such as cosine similarity, graph search, or other suitable methods may be used based on the vector embedding.

In some various configurations, the knowledge system 104 may be trained using encoder outputs in an end-to-end system. For example, the knowledge system 104 may be trained using encoder outputs and ground truth text to predict the action or text response. The prediction may be performed based on finding, for a given encoder output (e.g., an encoder output from a given text prompt), a match from a plurality of text responses each associated a ground truth text. In some embodiments, the encoder output in the knowledge system 104 may be associated with token probabilities, which may be provided to a decoder of the knowledge system 104 and used by the decoder to decode text.

In some embodiments, system 100 may include one or more output devices 116 configured to output the response from the knowledge system 104. In some embodiments, the one or more output devices 116 may include an audio device (e.g., a speaker), a display, an augmented reality (AR) device, a projector (e.g. a wearable projector), a haptics device (e.g., vibration on phone or a watch, electric shock), and/or any other suitable devices. In some embodiments, system 100 (e.g., knowledge system 104) may provide a response to the user in one or more forms each form may be output by one or more respective output devices. For example, knowledge system 104 may generate a text response, which may be displayed on a display of the user's device. Additionally, and/or alternatively, the response may be converted to a different form for output. For example, the text response may be converted by a text-to-speech (TTS) device for audio playback. In some embodiments, the TTS device may synthesize the audio in an optionally personalized voice. The audio playback may be output in a headphone, which can be directional, open-ear, bone-conduction, in-ear, over-ear, etc. The audio playback may be performed by a speaker, which may be bone conductive, e.g., in ear headphone, over-ear headphone, directional speaker, speakerphone, beamforming speaker, a phone or tertiary device speaker.

In non-limiting examples, the response from the knowledge system 104 may include text that is output on a phone (e.g., via an app, notification, banner, etc). For example, the response from system 100 (e.g., knowledge system 104) may be provided as text input to the phone in lieu of keyboard input. In an example scenario, the user may speak to the system 100 silently via the speech input device 110, which may convert the silent speech to a text input. Knowledge system 104 may provide the text input to the phone to control one or more operations on the phone (e.g., via an app).

In non-limiting examples, the response from knowledge system 104 may be converted from text to other form(s) of media. For example, knowledge system 104 may convert a response in textual form to a non-textual form, via integrations with other output devices. For example, the output devices may include models (e.g., text to image, text to 3D, or text to video) to convert the response in textual form to a non-textural form.

In non-limiting examples, the response of knowledge system 104 may include text output, which may include a synopsis (e.g., a summary) or full text output for displaying on an output device.

In non-limiting examples, the response of knowledge system 104 may include other forms, e.g., a haptics form, such as vibration (e.g., via a phone or a watch), electric shock, and/or other suitable form that is able to provide feedback to a user.

Although it is illustrated herein that the response from knowledge system 104 may be converted from one form to another for output, it is appreciated that alternatively, and/or additionally, knowledge system 104 may also generate a response directly in a suitable form for output on an output device. For example, the knowledge system 104 may be trained to generate a response in any suitable form (e.g., textual, audio wave, image, video, 2D/3D or other variable-dimensional representation of data) for output on a respective output device.

With further reference to FIG. 1, optionally, the knowledge system 104 may be configured to interact with one or more applications 128 (e.g., messaging system 118, email system 120, search system 122, note-taking system 124, or any other suitable real-world systems) to take the action or generate the response. In some embodiments, knowledge system 104 may interact with application systems 128, e.g., via web APIs, to cause the application systems to take one or more actions or generate the response, where the response may be output on any suitable output device(s) 116.

In some non-limiting examples, additional information, such as context, may be provided to the knowledge system 104, which may use the context to take an action or generate a response. In some examples, the context may be prepended to the prompt to the knowledge system 104. The contextual information may be used to improve the accuracy of the knowledge system 104. For example, as described above and further herein, as the silent speech model may be configured to generate encoded features (e.g., distribution of probability of tokens) and provide the encoded features to the knowledge system 104, the language model/beam decoder in the knowledge system 104 may incorporate that contextual information to decode the token probabilities appropriately. As a result, the knowledge system 104 may achieve a higher performance (e.g., better accuracy) even in the presence of transcription errors which may occur in the speech model.

In some embodiments, the context may include personalized characteristics of the user(s) associated with one or more applications 128, where the personalized characteristics may enable the knowledge system 104 to be fine-tuned to be specific to the user. In some embodiments, the context may be obtained from a stored user profile containing information about the user. For example, the context may include a location of the user, a contact list of the user, an email address of the user. In some embodiments, the context may contain information associated with receiving the transcription from the silent speech model. For example, the speech input device 110 or a paired device may provide other metadata to the knowledge system 104. In some examples, the metadata may include GPS data, which may be converted into text tokens by inferring location or directly providing latitude/longitude data associated with the user while the user is speaking.

In some embodiments, the context information may include information that describes the environment (e.g. an office, out in public, etc.) in which the user is speaking (or prompting the knowledge system). For example, the context information may include image(s) or video(s) from a camera on the speech input device or on another image capturing device, where the knowledge system 104 may be configured to accept both text prompt and image(s) or video(s). The image(s) or video(s) may include context about the user's surrounding to the device. In non-limiting examples, a user is speaking silently in a public setting, where the system provides contextual information of where the user (speaker) is and/or what the user is looking at.

In some embodiments, the context may include information associated with the one or more applications 128 with which the knowledge system 104 interacts. In other words, the personalized characteristics may be application specific. For example, in an email system (e.g., 120), the context may include an email history of the user. In a messaging system (e.g., 118), the context may include a message history of the user. In a messaging system (e.g., 118), email system (e.g., 120) and/or note-taking system (e.g., 124), the personalized characteristics may include grammar style (e.g., punctuations, emojis, capitalization, etc.) used by the user.

In some embodiments, the context may also include information from other knowledge bases, e.g., the Internet, a database, or applications that contain the user's personal information such as notes, private documents, health preferences, calendar information, or other information. In some embodiments, the context may include variables and states produced by previous calls to the knowledge system 104. This context may be stored and provided to later calls from the knowledge system 104.

In some embodiments, the context may include information of previous interactions with the same user in the interaction system 100. In some embodiments, for an interaction with a user, the knowledge system 104 may be queried with a number of previous interactions. For example, in a messaging system (e.g., 118), the context for interaction with a user may include a number of previous messages in prior interaction(s) with the same user. In a non-limiting example, the interaction system may be asked to draft a message to send to a user according to the same style that was previously used with that user.

In some embodiments, context may be provided to the knowledge system (e.g., 104) alongside the text prompt. In some embodiments, context may be stored and maintained separately, and provided to the knowledge system. For example, the system 100 may store context in a separate database and continuously update it while being used. Alternatively, and/or additionally, the context may not need to be provided to the knowledge system (e.g., 104) repeatedly every time the knowledge system is used, if the content of the context is static. In some embodiments, context may be stored in a context database (e.g., a vector database), which is configured to maintain history or previously provided context of the user's prior interactions with the interaction system (e.g., 100). The knowledge system (e.g., 104) may retrieve context information from the context database and use the retrieved context to take an action or generate a response. In some embodiments, the history (e.g., prior user interactions) can be maintained in the context database in the original form as it was provided and outputted to the user, for example, in a database, via embeddings, or some other suitable forms. The knowledge system (e.g., 104) may use the context by e.g. outputting code to query the context database, directly querying the database, via a look-up table, or other suitable methods. In some embodiments, the history may also be maintained implicitly via a fine-tuning of the machine learning foundation model based on the history of prior user interactions via supervised fine tuning, reinforcement learning, or other suitable methods.

In some embodiments, the various applications 128 may optionally generate textual output to return to the user. For example, the action or the response from the knowledge system 104 may include a clarifying question that can be prompted to the user. The speech model may receive a user input responsive to the clarifying questions. For example, the user input may be a silent speech, vocalized speech, or semi-vocalized speech (e.g., whisper). The speech model may generate a response to the clarifying question (e.g., text prompt) as input to the knowledge system 104 based on the user input. The knowledge system 104 may parse the response to the clarifying question and may take further action or generate additional response. In some embodiments, the knowledge system 104 may save the parsed response to the clarifying question as a variable that can be used for a future query.

The various embodiments as described above with respect to providing context to the knowledge system and/or clarifying questions to the user will be further illustrated with examples of one or more applications 128 further herein.

In an example messaging application, the knowledge system 104 may be configured to interact with a messaging system (e.g., 118) to generate a message and transmit the message over a communication network and/or output the message on an output device (e.g., 116). The message may have a variety of forms, such as text, voice, image, or other suitable media. The message system (e.g., 118) may include various types of messaging system, such as a text messaging system, an instant messaging system, an email system, and/or a voicemail system.

In some embodiments, the knowledge system 104 may interact with the messaging system (e.g., 118) to receive a query from the user and retrieve message(s) based on the query. For example, the system may receive a query from the user "What did John message me last?" In response, the system may retrieve the message that was sent by John last.

Additionally, and/or alternatively, the knowledge system 104 may query messages the user has sent to a given recipient user in the past. The system may use the examples from the query to format a future response. In non-limiting examples, in a "hang out" example, a text messaging system may search all of the previous text messages between a user and the person with whom the user hung out. For example, the system may search for messages that match "hang out" or "hang" or "meet" or that match in semantic similarity based on vector embedding matching. The system may provide all of the matches (although not all of which may relate exactly to the topic) and a prompt alongside context to the knowledge system or foundation model as: "Similar examples of text messages asking to hang out with John looked like the following <List here> Can you write a message to John asking if he's free to meet on Saturday"?

In some embodiments, context may be provided to and used by the messaging system (e.g., 118) to generate the messages. For example, the context may include a user's prior message history with an intended recipient, or writing style of the user as will be further described herein. In some embodiments, the knowledge system 104 may be fine-tuned for a specific user's text messaging style. For example, the knowledge system 104 may be fine-tuned for a user's text messaging style with each specific person with whom the user is messaging. In some embodiments, the knowledge system 104 may be fine-tuned to the messaging style depending on the group to which the recipient user belongs. For example, the system may apply different styles to a message being sent to recipient users belonging to different groups.

In some examples, the groups associated with a user may include friend, partner, colleagues, business partners, managers, employees, or any other suitable groups. In a non-limiting example, a user may provide a prompt (e.g., via silent speech to the speech input device 110) "ask John if he's free Saturday evening to hang out." The system may determine that John is a friend, and subsequently generates the message: "Hey John, what are you up to this Saturday? want to hang out in the evening?" In a non-limiting example. John is a partner. Subsequently, the system generates the message "Hey babe, let's go on a date Saturday evening? We can go out to dinner!"

In a non-limiting example, a user may enter a natural language request "let John know I'm late" via the speech input device 110 and speech model 106, which provides the text prompt to the knowledge system 104. The knowledge system 104 may provide the remainder of the response in a fully formed message that is tuned toward the style for John depending on the relationship between John and the user. For example, the system may generate a message "Hey John, I'm running late."

Alternatively, and/or additionally, the system may generate a response to ask the user to clarify the prompt. For example, the system may generate a question for the user: "Which John?" Upon the user's clarification of the recipient's name, the system may generate the messaging according to the style for that recipient.

In some embodiments, the system may output the generated message to the user (e.g., via display of text or via audio output) and ask the user to confirm the message. This may be implemented in various ways including via a user interface. For example, the system may receive a new prompt from the user to modify a previous response. In the above example, the user may correct the message, e.g., by providing a new prompt "I meant 20 minutes late." which can be used to modify the text of the immediate preceding message. Accordingly, the system may modify the response as, "Hey John, I'm running 20 minutes late." Optionally, the system may ask the user to confirm the message, e.g., "Hey John, I'm running late." In response, the user may enter a new prompt to confirm or modify the message.

In some embodiments, the context provided to the knowledge system 104 may include the entire message history associated with the user. For example, the entire conversation history with a given user (e.g., a recipient) in the interaction system 100 may be embedded, and that embedding may be provided as context to the knowledge system 104. In non-limiting examples, the embedding can be a vector embedding, or summary information of a message style, where the summary information of the message style may be obtained from message history associated with the given user and provided to the knowledge system 104 for subsequent operations.

In an example email application, the knowledge system 104 may be configured to interact with an email system (e.g., 120) to generate an email and transmit the email over a communication network. An email application may be configured in a similar manner as messaging application, with a difference being that the user can specify or edit the content of the email. For example, a previous email, or a whole email thread may be provided as context to the knowledge system 104. In some embodiments, the system may generate the email in stages. For example, the system may generate a draft email and output the draft email to the user (sender). The system may enable the user to edit the email before sending. In some embodiments, the system (e.g., via email system 120) may be configured to edit an email draft via silent speech, which can be transcribed using the techniques as described in the present disclosure. In non-limiting examples, the user may prompt with silent speech, e.g., "I meant x not y." or "can you make the tone more formal," etc.? Subsequently, the system (e.g., knowledge system 104) may receive the transcribed new user prompt and generate a new email according to the new user prompt. It is appreciated that the techniques described herein with respect to the interaction with the knowledge system may also enable a user to use a keyboard to directly edit the prompt.

In some embodiments, similar to the messaging application, context can be provided to the knowledge system 104, where the context may include a given user's email style. In some examples, a user's email style may include the names of other recipients (e.g., cc list) for a similar or same email thread. For example, a user may prompt the system to draft an email, where the user specifies the content of the email by providing "Let Ed know that we're talking to new clients next week and ask him to give me a call about updates to our strategy." In some embodiments, the knowledge system 104 may receive additional context based on a user's address book and/or user's previous emails as well. For example, the system may query the user's previous emails based on the sentence "Ed, strategy" to determine which Ed the user is referring to. Alternatively, and/or additionally, the system may also determine to copy Matthew (as was done in the user's previous emails to Ed), and then draft the email using the context from the user's past emails with Ed (determined as described above).

In an example search application, the knowledge system 104 may be configured to interact with a search system (e.g., 122) to generate and/or format a search query and generate search result as described in detail further herein. In some embodiments, the system may be configured to enable a user to enter a prompt via speech (e.g., voiced speech and/or silent speech) using the speech input device 110, and use a speech model (e.g., 106) to convert the speech to a text query for the search system. Similar to the other applications (e.g., text messaging, email), the system may output the converted text query for the user to correct (e.g., via speech prompt). Subsequently, the knowledge system 104 may perform the search using the text query (or corrected query) and generate the output.

In an example note-taking application, the knowledge system 104 may be configured to interact with a note-taking system (e.g., 124) to generate or format a note as described in detail further herein. The knowledge system 104 may be configured to connect to different note-taking apps, e.g., Notion, Apple Notes, etc. The knowledge system 104 may be configured to auto-format notes (i.e. add heading titles, etc.) which are application specific, either by generating markdown syntax, or commands that are required to generate the corresponding note-taking app specific text. In some embodiments, the knowledge system 104 may be configured to create a document paragraph (or a sentence) at a time.

In some embodiments, the knowledge system 104 may be configured to interact with a note-taking app and provide auto-format function. In non-limiting examples, system 100 may be configured to allow a user to dictate notes by providing notes via transcription of silent speech (and/or voice speech) as described above and further therein. In some embodiments, after a chunk of notes are dictated, the knowledge system 104 may be prompted with a user command to auto-format the notes. For example, the user may prompt the system to "organize this note into a markdown document." Subsequently, the system may re-format and reorganize the sections of the dictated notes into an actual formatted document with headings.

In some embodiments, auto-format may be automatically performed by the system while the user is dictating the notes. For example, the system may detect a pause in the user's dictation and, during the pause, automatically auto-format the notes that have been transcribed before the pause. In some embodiments, detecting a pause in a user's diction may be performed by various techniques. For example, the system may analyze the EMG data captured during the user's dictation to determine a time period in which the magnitude for the EMG data is below a threshold. Other methods for detecting a pause in silent speech, e.g., using a machine learning model, may also be possible.

In some embodiments, the knowledge system 104 may be configured to create notes documents one paragraph or one sentence at a time. For example, the system may enable a user to dictate a paragraph or sentence and pause. During the pause, the knowledge system 104 may automatically clean up the paragraph (e.g., turns the dictated notes into a grammatically correct paragraph), and then add it to the document.

In some embodiments, the knowledge system 104 may operate to toggle between a dictation mode and an expansion mode. In the dictation mode: the system may transcribe exactly the words said by the user, without filling in any gaps or doing any auto-formatting such as described above. In the expansion mode (or collaboration mode): the knowledge system may convert dictated notes into better phrases sentences/paragraphs, such as with auto-format and/or grammatic errors corrected. In the expansion mode, the knowledge system 104 may also be configured to enable a user to guide creation of notes, where the created notes may be a summary or expanded of what the user dictates. In some embodiments, the system may be configured to toggle between these two modes of note-taking based on a command, such as a gesture or a verbal command (e.g., via voiced or silent speech).

In some embodiments, the knowledge system 104 may be configured to enable a user to dictate notes while providing visual feedback. For example, the system may output (e.g., display) the created notes, or re-formatted or re-organized notes/paragraphs to the user while the user is dictating. In some examples, the visual feedback may be provided on a display in an AR device, e.g., AR glasses. The visual feedback enables the user to see the intermediate output and thus, can instantly enter new prompts (e.g., via silent speech) to correct the created notes.

In some embodiments, the various embodiments described in FIG. 1 may be implemented in a payment system in which the knowledge system 104 may be configured to make a transaction in the payment system as described in detail further herein. In non-limiting examples, the actions taken by the knowledge system 104 may include making a purchase in a payment system. For example, system 100 may use the electronic signal (as described above and further herein) indicative of the user's muscle activation patterns when the user is speaking or when the user is passively wearing the device (e.g., EMG data) as a signature to authenticate a user; and using the authentication of the user to trigger a transaction in the payment system. In some embodiments, authenticating may include extracting a signature from the EMG data and compare the extracted signature with a prestored user-specific signature for that user. If a match is found (e.g., a correlation between the extracted signature and the prestored signature for the user exceeds a threshold), then the system may authenticate the user. Otherwise, the authentication fails. In other variations, authentication may be performed using a classifier or any other suitable techniques, such as machine learning techniques.

Having described the examples of the one or more applications (e.g., 128) in various embodiments, in some embodiments, system 100 may use the silent speech command to infer which application should be used and use that application to take the action or generate the response. For example, the user may input (e.g., via speech or keyboard input) "let John know I'm running late." In response, the system (e.g., system 100) may infer whether it's a video call for which the user is running late. Responsive to determining that it is a video call, the system may open an email application (e.g., 120) and send an email to John, or open a text messaging application (e.g., 118) and send John a text message if John is in the user's contacts. Alternatively, the system may prompt the user with a clarifying question, such as "which application would you like to use to book the cab?" It is appreciated that the system may infer any application, including the one or more applications (e.g., 128) or other suitable systems. For example, the user may enter "book me a cab to the office." and the system may infer an Uber application to be opened, and automatically open the Uber application. In some embodiments, system 100 may include a graphical user interface to receive user input. Opening an application may include opening the application on the graphical user interface of the system.

Figure 2:
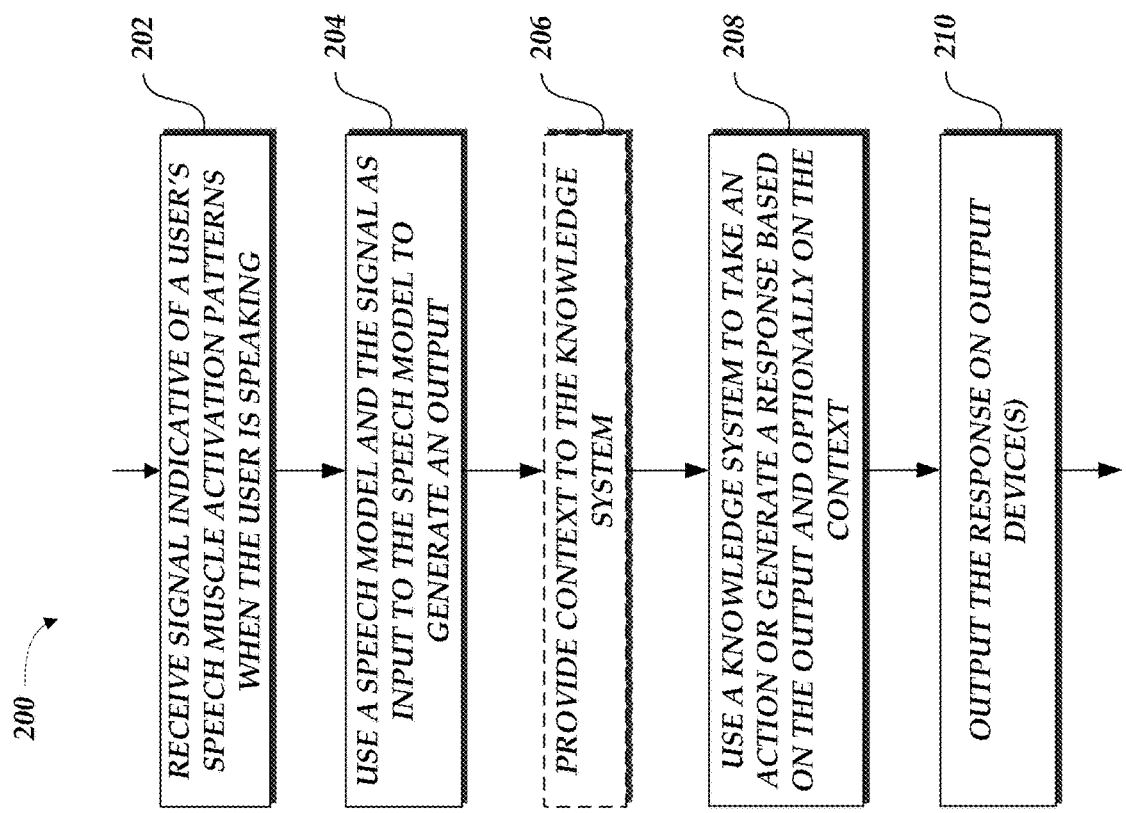
FIG. 2 is a flow diagram of an example process that may be implemented in an interaction system to take an action or generate a response based on user speech, according to some embodiments.

Various embodiments in system 100 in FIG. 1 may be implemented in one or more processes as will be further described in FIGS. 2-3. FIG. 2 is a flow diagram of an example process 200 that may be implemented in an interaction system to take an action or generate a response based on user speech, according to some embodiments. In some embodiments, process 200 may be implemented in the interaction system 100 (FIG. 1). Process 200 may include receiving a signal indicative of a user's speech muscle activation patterns when the user is speaking, at act 202. Process 200 may further include using a speech model and the signal as an input to the speech model to generate an output, at act 204; using a knowledge system to take an action or generate a response based on the output, at act 208; and outputting the response on one or more output device(s), at act 210.

In some embodiments, acts 202, 204, 208, and 210 may be performed in a similar manner as described in embodiments in FIG. 1. For example, act 202 may be performed to receive a signal indicative of a user's speech muscle activation patterns associated with the user speaking from one or more sensors (e.g., 102 in FIG. 1). The one or more sensors may be installed in a speech input device (e.g., 110 in FIG. 1). In some embodiments, the one or more sensors may include an EMG sensor configured to capture EMG signal when the user is silently speaking or articulating. In some embodiments, one or more additional sensors may be used to measure respective signals when the user is articulating. In some embodiments, the signal indicative of a user's speech muscle activation patterns associated with the user speaking may be recorded non-invasively from one or more regions of face and/or neck of the user via a conductive electrode coupled to an electronic amplifier system, where the conductive electrode may include one or more of the sensors (e.g., 102 in FIG. 1). In some embodiments, speaking may include a voiced speech, a silent speech, or a sub-vocalized speech (e.g., whispering) as described above in embodiments in FIG. 1.

In some embodiments, act 204 may be performed at a speech model (e.g., 106 in FIG. 1) to generate an output, where the output may include text prompt and/or encoded features as described herein with respect to embodiments in FIG. 1. In some embodiments, the speech model may include a silent speech model configured to generate the text prompt using a signal (e.g., EMG signal) indicative of the user's speech muscle activation patterns associated with the user silently speaking. Details of the speech model are further provided in embodiments in FIGS. 9-13.

In some embodiments, act 208 may be performed at a knowledge system (e.g., 104 in FIG. 1) to take an action or generate a response based on the text prompt generated by the speech model (e.g., 110 in FIG. 1). In some embodiments, the knowledge system (e.g., 104 in FIG. 1) may include a machine learning foundation model, e.g., a LLM, which may be configured to take the action or generate the response based on the text prompt generated by the speech model. For example, the machine learning foundation model may be configured to use the text prompt as input and generate the response by sampling text from a distribution of possible responses. The knowledge system is described in detail above in embodiments in FIG. 1.

In some embodiments, act 210 may be performed in an interaction system (e.g., 100 in FIG. 1) using one or more output devices (e.g., 116 in FIG. 1), which are described in detail in embodiments in FIG. 1. For example, the response may be one or more of the following forms: a text format, an auditory signal, an image format, a video format, an AR form, and/or a haptics form. The response in any format may be output on a respective output device (e.g., 116 in FIG. 1).

With further reference to FIG. 2, process 200 may optionally include providing context to the knowledge system, at act 206. Thus, act 208 may be performed optionally based on the context. The details of context are further provided in embodiments in FIG. 1 and are applicable to act 206 in FIG. 2. For example, the context may include personalized characteristics of the users associated with one or more applications (e.g., 128 in FIG. 1) to which the knowledge system (e.g., 104 in FIG. 1) interacts. In some embodiments, the context may be obtained from a stored user profile containing information about the user. In some embodiments, the context may contain information associated with receiving the transcription from the silent speech model, such as metadata, e.g., GPS data associated with the user's location while the user is speaking.

In some embodiments, the context information may include information that describes the environment (e.g. an office, out in public, etc.) in which the user is speaking (or prompting the knowledge system). In some embodiments, the context may include information associated with the one or more applications (e.g., 128 in FIG. 1) with which the knowledge system (e.g., 104 in FIG. 1) interacts. In some embodiments, the context may also include information from other knowledge bases, e.g., the Internet, a database, or applications that contain the user's personal information such as notes, private documents, health preferences, calendar information, or other information. In some embodiments, the context may include variables and states produced by previous calls to the knowledge system (e.g., 104 in FIG. 1). In some embodiments, the context may include information of previous interactions with the same user in the interaction system (e.g., 100 in FIG. 1).

FIG. 3 is a flow diagram of an example process 300 that may be implemented in an interaction system to take additional action or generate additional response based on a user prompt responsive to a clarifying questions, according to some embodiments. In some embodiments, process 300 may be implemented in an interaction system (e.g., 100 in FIG. 1) as described in various embodiments of FIG. 1. For example, process 300 may include prompting the user with a clarifying question, at act 302. In some embodiments, the response from the knowledge system (e.g., provided at act 208 in FIG. 2) may include a clarifying question for the user.

With further reference to FIG. 3, process 300 may include receiving a user input from the user (e.g., via a speech input device such as 110 in FIG. 1) responsive to the clarifying question, at act 304. Process 300 may further include using the speech model and the user input to generate a text prompt, at act 306; and using the knowledge system to take additional action or generate additional response based on the text prompt, at act 308. Examples of acts 302-308 are provided in detail in the context of various applications as described in embodiments in FIG. 1, such as messaging, email, search, and note-taking. It is appreciated that presenting a clarifying question to the user and processing the user's response to the clarifying question may also be applicable in other applications/systems as described in embodiments in FIG. 1.

Although various embodiments are described herein with reference to FIGS. 1-3, other variations are possible. For example, the applications that may be enabled by an interaction system (e.g., 100 in FIG. 1) and processes (e.g., 200 and 300 in FIGS. 2-3) are only example applications and processes and do not limit the scope of the disclosure. It is appreciated that various components of system 100 in FIG. 1 may be configured to interact with other suitable systems such as, for example, a ride-share system (e.g., via interfacing with Uber plugins), a programming integrated development environment (IDE) (e.g., providing input to a code IDE), a web browser, a map system (e.g., Google maps), a messaging system, an email system, a database/knowledge store (unless included separately), a music player, a podcast player, an audio player, a design system (e.g., Figma), a computer terminal (e.g., iTerm), and/or a personal assistant (e.g., via interfacing with Siri/Alexa/Google Assistant, optionally by using TTS).

Additionally, and/or alternatively, various components of system 100 in FIG. 1 may also be configured to interact with other suitable systems such as a CRM/contacts system, a task management system, system preferences/device systems (e.g., a system for turning Wi-Fi off), a smart home system (e.g., Nest hub), an ecommerce platform (e.g., online shopping), a health tracking platform (e.g., Apple Health), a food logging system, a workout tracking device/system, a calendar system (e.g., Google calendar), a logging system (e.g., process logging, standard operating procedure checklists, maintenance logging, error reporting etc.), a food ordering system, an in-vehicle multimedia/entertainment system, a mental health/meditation platform (e.g., Calm), a travel system (e.g., book a cheapest flight to a destination), a weather forecast system (e.g., via interfacing with weather apps), or a combination thereof.

Furthermore, it is appreciated that any features as illustrated in an example application described herein may not be limited to that application, but can also apply to other suitable applications. For example, the context of messaging style as illustrated in the messaging system above may not be limited to the messaging application, but can also be used in other applications, such as note-taking (e.g. professional vs. personal notes), email system, etc. In other configurations, the message generation may be performed by the knowledge system (e.g., 104), or the knowledge system in combination with context associated with the messaging system (e.g., 118).

Further, although various embodiments provide for separate knowledge system (e.g., 104) and speech model (e.g., 106), it is appreciated that the speech model and the knowledge system may be integrated as a singular large AI model. The singular large AI model may be trained end to end with a combination of EMG speech training data, audio training data, and text training data. The audio training data and text training data may be obtained from the Internet. In some embodiments, the integrated singular AI model may include a transformer encoder and decoder. The encoder may be configured to encode the text or audio. The decoder may be configured to decode a text sequence given the encoded features and the previously decoded text words. The model can be trained with EMG to text data, audio to text (over long sequences), or pure text data. In comparing to conventional foundation models, the integrated model may include multiple modalities and thus richer encoded features, which may result in an improved accuracy.

Figure 4A:
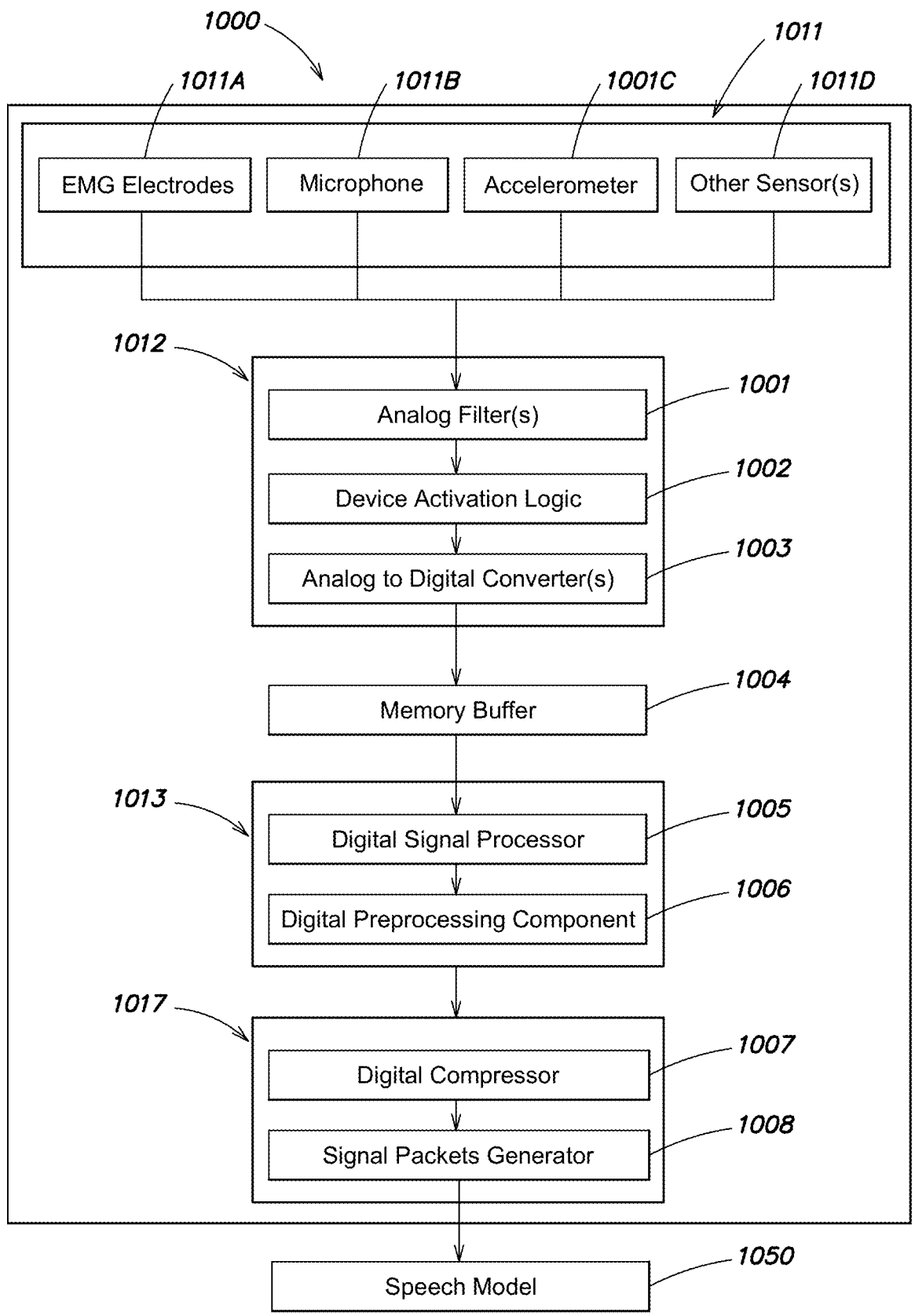
FIG. 4A is a scheme diagram of an example speech input device capable of communicating with a speech model external to the speech input device, in accordance with some embodiments of the technology described herein.

FIG. 4A is a scheme diagram of an example speech input device 1000 capable of communicating with a speech model 1050 external to the speech input device, in accordance with some embodiments of the technology described herein. In some embodiments, the speech input device 1000 may be included in the user interaction system 100 (FIG. 1). For example, the speech input device 100 may be an example configuration of the speech input device 110 (FIG. 1). In some embodiments, the speech input device 1000 may include one or more sensors 1011, which record signals indicating a user's speech muscle activation patterns associated with the user speaking (e.g., in a silent, voiced, or whispered speech). In non-limiting examples, the one or more sensors 1011 may include one or more EMG electrodes 1011A, a microphone 1011B, an accelerometer 1011C and/or other suitable sensors 1011D. The signals collected from the sensors may be analog signals which are provided to the signal processing unit of the speech input device.

In some embodiments, the speech input device 1000 may include a signal processing unit 1012, one or more processors 1013, and a communication interface 1017. The signal processing unit 1012 may include one or more analog filters 1001, a device activation logic 1002, and one or more analog-to-digital converters 1003. The analog filters 1001 may be used to improve the quality of the signals for later processing. For example, the analog filters 1001 may include a high-pass filter, a low-pass filter, a bandpass filter, a moving average filter, a band stop filter, a Butterworth filter, an elliptic filter, a Bessel filter, a comb filter, and a gaussian filter, or a combination thereof. It is appreciated that the analog filters many include other suitable filters. The analog filters 1001 may be implemented as a circuitry within the speech input device 1000.

The device activation logic 1002 may analyze the filtered signals provided from the analog filter(s) 1001 to determine the presence of one or more activation signals recognized from the analog signals. For example, a user may say a particular word or phrase out loud, which is recorded by the microphone. The device activation logic 1002 may recognize this word or phrase and in response will perform one or more actions. The one or more actions may include changing a mode of the device, activating one or more features of the device, and performing one or more actions. The device activation logic 1002 may analyze analog filtered signals as shown, unfiltered analog signals, digital signals, filtered digital signals and/or any other signal recorded from the one or more sensors. The device activation 1002 logic may operate on signals from any of the sensors, e.g., the EMG electrodes 1011A, the microphone 1011B, the accelerometer 1011C, and any other sensors 1011D in the speech input device 1000. Although the device activation logic 1002 is shown to be implemented in signal processing unit 1012, it is appreciated that the device activation logic 1002 may be implemented in any suitable component of the speech input device 1000, e.g., one or more processors 1013.

In some embodiments, digital converters 1003 may convert analog signals to digital signals. The signals input to the analog-to-digital converters may be filtered or unfiltered signals. For example, analog signals from the one or more sensors (e.g., 1011) may be directly passed to one or more analog-to-digital converters 1003 without the analog filters 1001. In some embodiments, there may be a respective individual analog-to-digital converter for each sensor (e.g., any of 1011). The one or more analog-to-digital converters 1003 may be implemented as circuitry within the speech input device 1000, e.g., a chip or application specific integrated circuit (ASIC). Any suitable analog-to-digital converter circuit configuration may be used.

In some embodiments, the one or more processors 1013 may perform a series of processes on the signals received from the sensors. As shown, the one or more processors 1013 may process signals from the one or more sensors 1011, or via the signal processing unit 1012. Additionally, and/or alternatively, the speech input device 1000 may include one or more memory buffers 1004. The memory buffers 1004 may temporarily store data as it is transferred between the signal processing unit 1012 and one or more processors 1013, or between any other internal units of the one or more processors 1013, or between any components of the speech input device 1000. The memory buffers 1004 may be implemented as hardware modules or may be implemented as software programs which store the data in a particular location within a memory of the speech input device 1000. The memory buffers 1004 may store data including analog and/or digital signals, such as filtered signals from analog filter(s) 1001, digital signals from analog-to-digital converter(s) 1003, control signals from the device activation logic 1002, and any other data from within the speech input device 1000.

In some embodiments, the one or more processors 1013 may include a digital signal processor 1005 configured to perform digital signal processing on digital signals from the analog-to-digital converter(s) 1003, for example, or digital data stored in the memory buffer 1004. In some embodiments, digital signal processor 1005 may process the digital signals and improve the quality thereof for later processes. In some embodiments, the digital signals may undergo one or more digital processing operations in the digital signal processor 1005. In some embodiments, the digital processing in the digital signal processor 1005 may be tailored to specific signals, e.g., signals from the EMG electrodes 1011A, which may undergo specific digital processing that is different from processing executed on signals recorded from the microphone 1011B. Examples of digital signal processing performed in the digital signal processor 1005 include digital filtering of the signals, feature extraction, Fourier analysis of signals, Z-plane analysis, and/or any other suitable digital processing techniques.

In some examples, the digital signal processor 1005 may include one or more layers of a neural network and/or a machine learning model maintained by the speech input device to generate digital signal vector(s). Additionally, and/or alternatively, the one or more processors 1013 may include a digital preprocessing component 1006 configured to perform one or more preprocessing operations, e.g., normalization of data, cropping of data, sizing of data, reshaping of data, and/or other suitable preprocessing actions.

In some embodiments, the communication interface 1017 may be configured to receive signals from other units, e.g., 1011, 1012, 1013, and prepare data for further processing. In some embodiments, the communication interface 1017 may include a digital compressor 1007 configured to compress the received signals and a signal packets generator 1008 configured to perform signal packaging for transmission. In some embodiments, the signals received at the communication interface 1017 may undergo digital compression at the digital compressor 1007 and the compressed data from digital compressor 1007 may be packaged for transmission. In non-limiting examples, digital compression may be performed at digital compressor 1007 on one or more signals in order to reduce the amount of data transmitted by the speech input device. Digital compression performed at digital compressor 1007 may use any suitable techniques, e.g., lossy and lossless compression techniques.

In some embodiments, signal packaging may be performed at signal packets generator 1008 to format (e.g., packetize) data for transmission according to a particular transmission modality. For example, a signal may be packetized with additional information to form a complete Bluetooth packet for transmission to an external Bluetooth device. In the example shown in FIG. 4A, the packetized signal may be sent to an external device having a speech model 1050 for converting to text, for example.

Figure 4B:
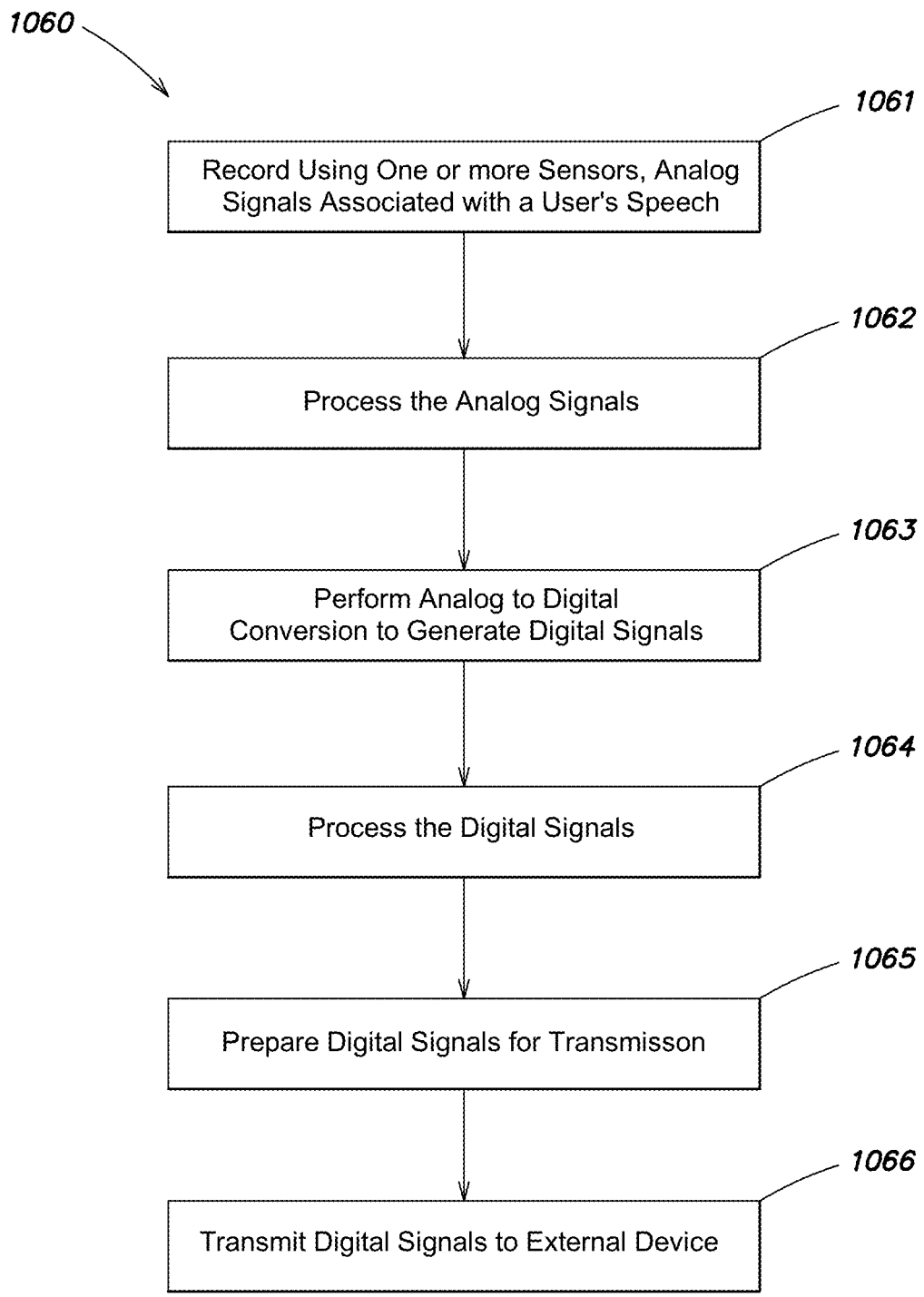
FIG. 4B is a flow diagram of an example process which may be performed by a speech input device, in accordance with some embodiments of the technology described herein.

FIG. 4B is a flow diagram of an example process 1060 which may be performed by a speech input device such as speech input device 1000 shown in FIG. 4A, in accordance with some embodiments of the technology described herein. In some embodiments, process 1060 may be performed by one or more components in the speech input device 1000 (FIG. 4A) to capture sensor data when the user is speaking and process the sensor data before transmitting to an external device. In some embodiments, method 1060 may start with capturing, at one or more sensors (e.g., 1011 in FIG. 4A), speech signals from a user associated with the user's speech, at act 1061. In some embodiments, the speech signals captured from the sensors may be analog signals. Method 1060 may further include processing the captured analog signals at act 1062. In some examples, act 1062 may be performed at signal processing unit 1012 (FIG. 4A) and may include various processing operations, e.g., filtering, feature extraction, device activation, and machine learning processing, among other techniques as described above and further herein.

With further reference to FIG. 4B, method 1060 may include performing analog-to-digital conversion to generate digital signals, at act 1063. In some examples, act 1063 may be performed at analog-to-digital converter(s) (e.g., 1003 in FIG. 4A). Method 1060 may further include processing the digital signals, at act 1064. For example, act 1064 may be performed at digital signal processor 1005, and optionally, digital preprocessing component 1006 (FIG. 4A). For example, act 1064 may include digital filtering of the signals, feature extraction, Fourier analysis of signals, machine learning processing and Z-plane analysis, among other processing techniques as described above and further herein.

With further reference to FIG. 4B, method 1060 may further include preparing digital signals for transmission, at act 1065. In some embodiments, act 1065 may be performed at communication interface 1017 (FIG. 4A). For example, act 1065 may include preprocessing signals, compressing signals and packetizing data as discussed above and further herein. Method 1060 may also include transmitting the signals from act 1065 to an external device, at act 1066. The signals may be transmitted using any suitable protocol, as discussed herein.

In some embodiments, the signals transmitted from the speech input device 1000 to the external device (e.g., 1050 in FIG. 4A) may include sensor data associated with a user's speech (e.g., silent speech), or the processed sensor data. The external device may include a speech model configured to convert the sensor data (or processed sensor data) to text or encoded features for use with any suitable system, where the encoded features may include information about the uncertainty of the text. Thus, the combination of the speech input device and the external device enables a wide range of systems and applications that can utilize the speech model. In non-limiting examples, the external device may be a computer, a laptop, or a mobile phone that includes a speech model, and is capable of communicating with speech input device (e.g., 1000) to receive the sensor data associated with a user's speech, where the speech model is also configured to convert the sensor data to text or encoded features. The computer, laptop, or the mobile phone may implement any application to take one or more actions. For example, the computer, laptop, or the mobile phone may implement a user interaction system, such as system 100 shown in FIG. 1, which receives text prompt or encoded features from the speech model to take one or more actions. The user interaction system may be implemented in the computer to interact with a knowledge system by providing the received text prompt or encoded features from the speech model to the knowledge system, and cause the knowledge system to take the one or more actions. It is appreciated that any other suitable systems may be enabled by the speech input device.

It is appreciated that the various processes as discussed with acts in method 1060 may not be all performed, or may be performed in any suitable combination or order. Each signal as captured at the one or more sensors (e.g., 1011) may have associated processing operations that may be tailored to that particular signal. Different types of signals may be processed in a series of respective different operations. For example, signals from the EMG electrodes may undergo all operations in method 1060 whereas signals from the microphone may only undergo analog to digital conversion at act 1063 and digital processing at act 1064. In some embodiments, the processing performed at each of the processing operations of in a series of processing operations in method 1060 may also be different for each signal received from the sensor(s). For example, analog filters used by act 1062 may include a high-pass filter for signals received from the microphone, and include a bandpass filter for signals received from the EMG electrodes.

Figure 5A:
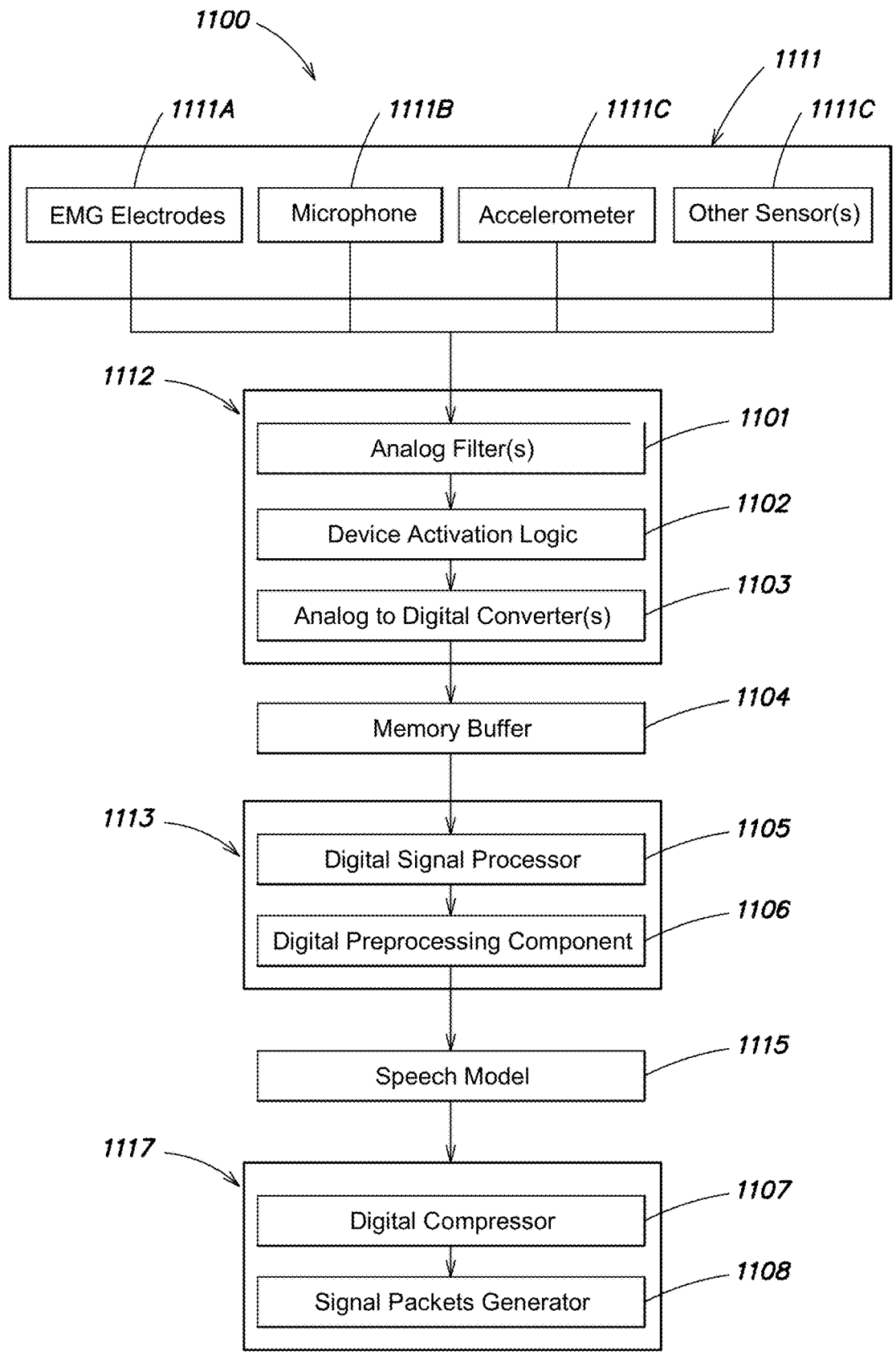
FIG. 5A is a scheme diagram of an example speech input device including a silent speech model, in accordance with some embodiments of the technology described herein.

FIG. 5A is a scheme diagram of an example speech input device 1100 including a silent speech model, in accordance with some embodiments of the technology described herein. In some embodiments, speech input device 1100 may have a similar configuration as speech input device 1000 (FIG. 4A) with a difference being that speech input device 1100 in FIG. 5A includes an embedded speech model 1115, rather than the speech model being external to the speech input device as in FIG. 4A. Thus, the numerals 1000's in FIG. 4A and numerals 1100's in FIG. 5A may correspond to similar components when the last two digits are the same. For example, 1111 in FIG. 5A may correspond to one or more sensors 1011 in FIG. 4A for capturing electrical signals indicating the user's speech muscle activation patterns or other measurements when the user is speaking (e.g., in a voiced, silent, or whisper speech). Similarly, 1112 in FIG. 5A may correspond to signal processing unit 1012 in FIG. 4A.

As shown in FIG. 5A, speech input device 1100 may additionally include a speech model 1115 configured to covert the digital signals from one or more processors 1113 to text or encoded features. The speech model and the training thereof will be further described in embodiments in FIGS. 9-13. With further reference to FIG. 5A, speech model 1115 may provide the text or encoded features to the communication interface 1117 for transmitting to an external device. In some embodiments, the communication interface 1117 may transmit the compressed/packetized text or encoded features to an application on the external device via a communication link such as a wired connection or a wireless connection.

Figure 5B:
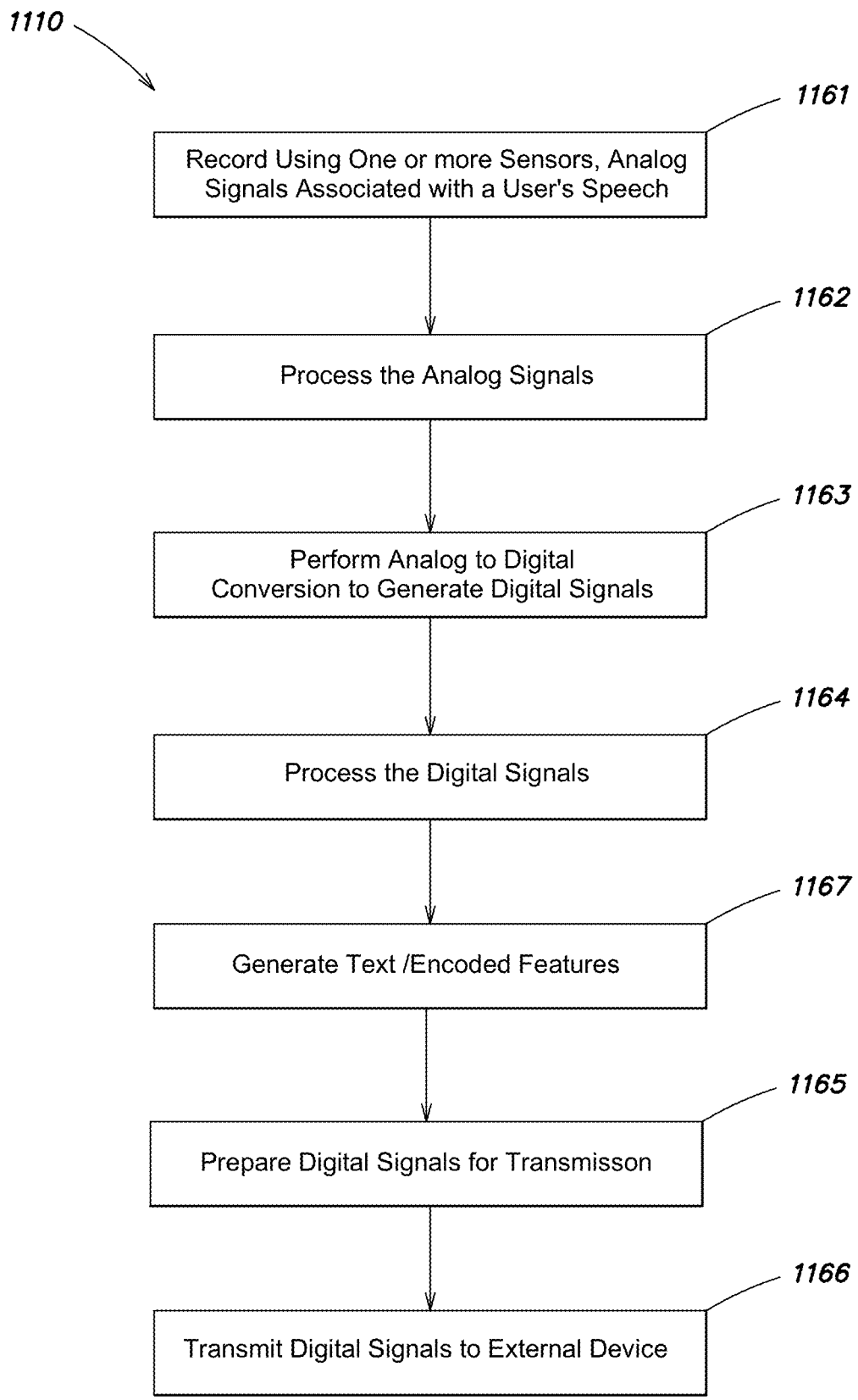
FIG. 5B is a flow diagram of an example process including the use of a silent speech model, where the process may be performed by a speech input device, in accordance with some embodiments of the technology described herein.

FIG. 5B is a flow diagram of an example process 1160 including the use of a silent speech model, where the process may be performed by a speech input device, e.g., 1100 (FIG. 5A) in accordance with some embodiments of the technology described herein. Various acts in process 1160 may correspond to acts with the numerals alike in process 1060 in FIG. 4B. For example, method 1160 may be similar to method 1060 (FIG. 4B), with a difference being that method 1160 may generate text or encoded features at act 1167, where act 1167 may be performed using a speech model (e.g., 1115 in FIG. 5A). Subsequent to generating the text or encoded features, method 1160 may prepare the output of the speech model (e.g., compressing, packetizing) at act 1165, and transmit the output to the external device, at act 1166.

As similar to FIGS. 4A and 4B, speech input device 1100 (FIG. 5A), with the combination of an external device may enable a wide range of systems and applications in a similar manner as with speech input device 1000 (FIG. 4A). In non-limiting examples, the external device may be a computer, a laptop, or a mobile phone that is capable of communicating with speech input device (e.g., 1100) to receive text or encoded features associated with the user's speech, where the text prompt or encoded features are generated by the speech model in the speech input device, using the sensor data captured at the speech input device. The external device may use the received text or encoded features to enable any application. For example, the application may be as interaction system, e.g., system 100 (FIG. 1), which receives the text prompt or encoded features from the speech model and provide the text prompt or encoded features to a knowledge system to take one or more actions.

Figure 6A:
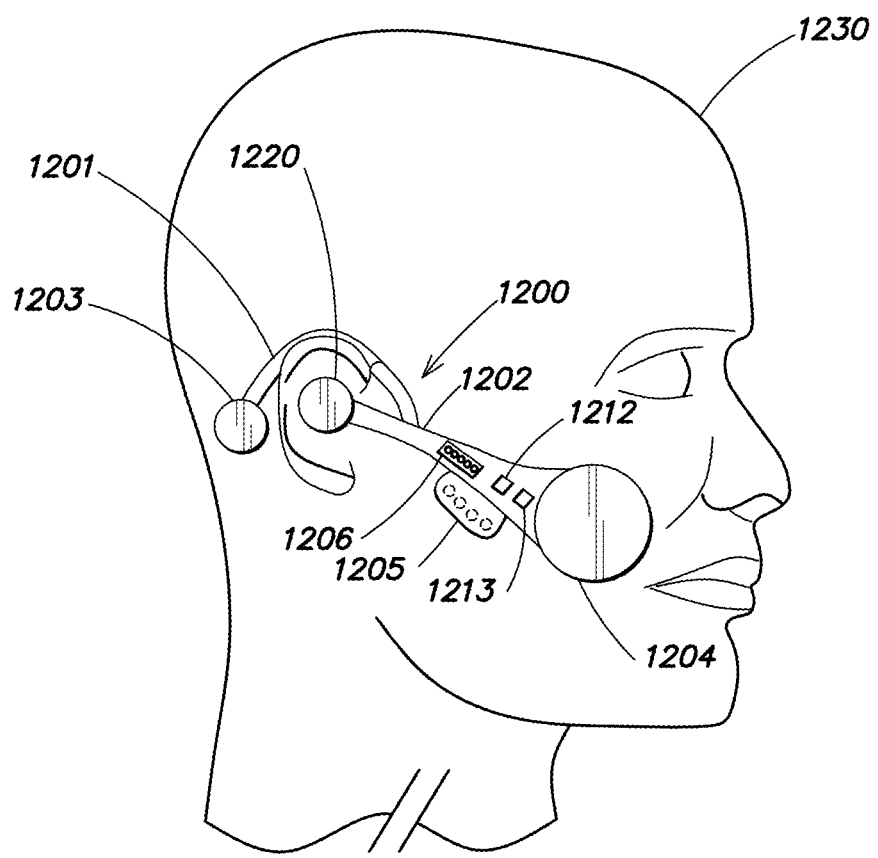
FIG. 6A is a perspective view of a wearable speech input device having an ear hook embodiment and wearable on a user's ear, in accordance with some embodiments of the technology described herein.

FIG. 6A is a perspective view of a wearable speech input device 1200 having an ear hook embodiment and wearable on a user's ear, in accordance with some embodiments of the technology described herein. The wearable speech input device 1200 may be an example implementation of the speech input device, e.g., 1000 (FIG. 4A), 1100 (FIG. 5A) as described in embodiments in FIGS. 4A-5B. In some embodiments, the wearable device 1200 may include an ear hook portion 1201 configured to fit around the top of a user's ear. The ear hook 1201 may support a sensor arm 1202 of the wearable device 1200 and a reference electrode 1203 of the device. The ear hook 1201 may be adjustable to conform to the anatomy of a user 1230. The wearable device 1200 may additionally include one or more inputs 1206 (e.g., buttons) accessible to the user 1230 while the wearable device 1200 is being worn.

With further reference to FIG. 6A, the wearable device 1200 may include a sensor arm 1202, supported by the ear hook 1201. The sensor arm 1202 may contain one or more sensors 1205 for capturing speech signals indicating a user's speech muscle activation patterns or other measurements from the user 1230 when the user is speaking. The one or more sensors 1205 may include any of the sensors 1011 (FIG. 4A) or 1111 (FIG. 5A) or any other suitable sensors. In some embodiments, the one or more sensors supported by the sensor arm may include EMG electrodes 1204 configured to detect EMG signals associated with the user speaking. The EMG electrodes 1204 may be configured as an electrode array or multiple electrode arrays supported by the sensor arm 1202 of the wearable device 1200. Although the EMG electrodes 1204 are shown to be positioned at a distal end of the sensor arm 1202, in other embodiments, the EMG electrodes 1204 may be dispersed over the sensor arm. The one or more electrode arrays may have any suitable shapes e.g., a circular, a square, a rectangular, or any other suitable shape. The sensor arm 1202 may be configured to provide a force to maintain contact between the face of the user and the EMG electrodes, which are located on a side of the sensor arm 1202, facing the user 1230.

In some embodiments, the sensors 1205 may include a microphone for recording voiced or whispered speech, and an accelerometer or IMU for recording motion associated with speech. The sensors 1205 may additionally include sensors configured to measure a position of a user's tongue, blood flow of the user, muscle strain of the user, muscle frequencies of the user, temperatures of the user, and magnetic fields of the user, or a combination thereof, or any other suitable measurements. For example, the sensors 1205 may include photoplethysmogram (PPG) sensors, photodiodes, optical sensors, laser doppler imaging, mechanomyography sensors, sonomyography sensors, ultrasound sensors, infrared sensors, functional near-infrared spectroscopy (fNIRS) sensors, capacitive sensors, electroglottography sensors, electroencephalogram (EEG) sensors, and magnetoencephalography (MEG) sensors, or any other suitable sensors.

With further reference to FIG. 6A, in some embodiments, the one or more sensors 1205 may include a reference electrode 1203. Ear hook 1201 may additionally support the reference electrode 1203. The reference electrode 1203 may be disposed on a side of the ear hook 1201, facing the user 1230. In some examples, the reference electrode 1203 may be used in conjunction with the electrodes 1204 supported by the sensor arm 1202 as inputs to a differential amplifier. The reference electrode 1203 may provide a first potential or voltage to the user. The electrodes 1204 supported by the sensor arm 1202 may record electrical signals at the face of the user. The differential amplifier may take as inputs a voltage equal to that of the reference electrode 1203 and electrical signals recorded by the electrodes 1204 supported by the sensor arm 1202. The differential amplifier may amplify a difference between input voltages from electrical signals recorded by the reference electrode 1203 and the electrical signals recorded by the electrodes 1204, representing the voltage generated by the muscles in the face of the user. Additionally, the differential amplifier may suppress any voltages common to the two inputs. The reference voltage supplied to the face of the user by the reference electrode 1203 will be recorded by the electrodes 1204 supported by the sensor arm 1202, in addition to the voltage generated by muscles in the face of the user. In some embodiments, a suitable circuitry (e.g., a chip, an ASIC) for the differential amplifier may be contained within the wearable device 1200.

In some embodiments, the wearable device 1200 may include a speaker 1220 positioned at an end of the sensor arm. The speaker 1220 is positioned at the end of the sensor arm 1202 configured to be positioned proximate to the user's ear. In some embodiments, the speaker 1220 may be inserted into the user's ear to play sounds (e.g., via bone conducting). In some embodiments, the speaker 1220 may play sounds aloud adjacent to the user's ear. The speaker 1220 may be used to play outputs of silent speech processing or communication signals as discussed herein. For example, the speaker may play output of the speech model (1115 in FIG. 5A) via text to speech (TSS) techniques. In addition, the speaker 1220 may be used to play one or more outputs from a connected external device, or the wearable device, such as music, audio associated with video or other audio output signals. Although a limited number of components are shown in FIG. 6A, it is appreciated that the wearable device 1200 may include other components, which may be needed to make the wearable device 1200 functional. For example, the wearable device 1200 may include one or more processors 1212 configured to perform any operations as described above in FIGS. 4B and 5B, and further herein. Additionally, and/or alternatively, wearable device 1200 may include a speech model 1213 to convert sensor data from the sensors to text or encoded features as described above in FIGS. 5A-5B. Additionally, and/or alternatively, the wearable device 1200 may include a charging port, a data transfer port, or any other suitable components.

Figure 6B:
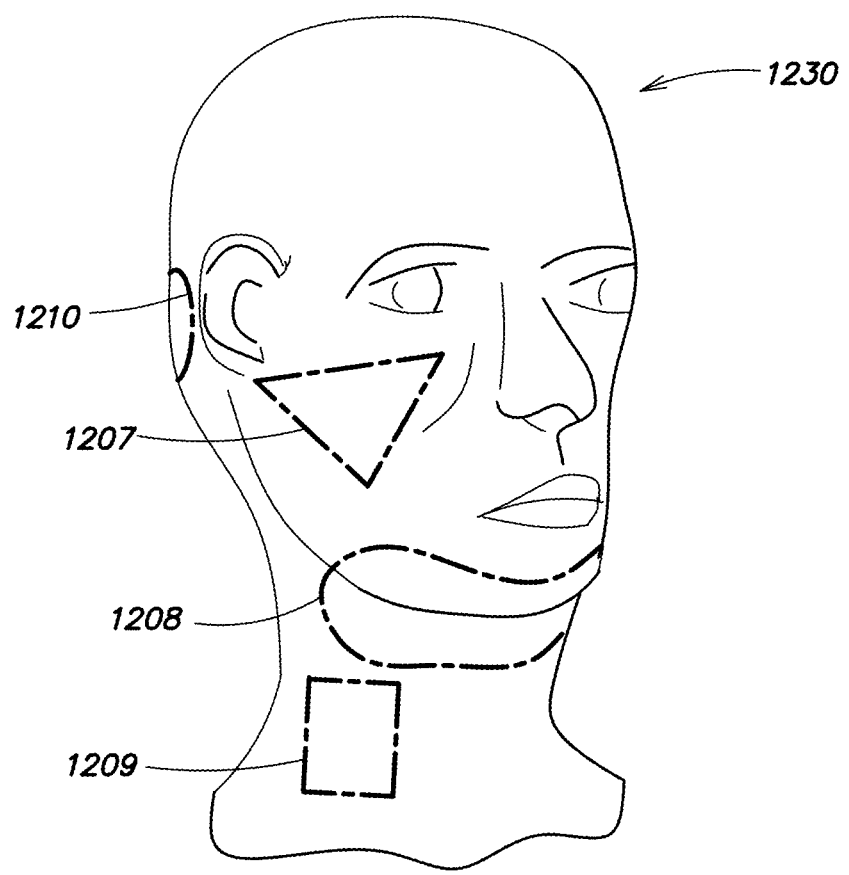
FIG. 6B is an illustration of wearable device target zone(s) associated with a wearable speech input device, in accordance with some embodiments of the technology described herein.

FIG. 6B is an illustration of wearable device target zone(s) associated with a wearable speech input device such as wearable device 1200 (FIG. 6A), in accordance with some embodiments of the technology described herein. The target zones may include one or more areas on or near the user's body part, in which sensor(s) can be placed to measure speech muscle activation patterns while the user is speaking (silently or with voice). For example, the speech muscle activation patterns at various target zones may include facial muscle movement, neck muscle movement, chin muscle movement, or a combination thereof associated with the user speaking. In some examples, the sensors may be placed at or near a target zone at which the sensors may be configured to measure the blood flow that occurs as a result of the speech muscle activation associated with the user speaking. Thus, the wearable device 1200 may be configured to have its sensors positioned to contact one or more target zones, such as the face and neck of the user.

With further reference to FIG. 6B, various target zones are shown. In some embodiments, a first target zone 1207 may be on the cheek of the user 1230. This first target zone 1207 may be used to record electrical signals associated with muscles in the face and lips of the user, including the zygomaticus of the user, the masseter of the user, the buccinator of the user, the risorius of the user, the platysma of the user, the orbicularis oris of the user, the depressor anguli oris of the user, the depressor labii, the mentalis, and the depressor septi of the user.

In some embodiments, various sensors may be positioned at the first target zone 1207. For example, electrodes (e.g., 1204 in FIG. 6A) supported by the wearable device 1200 (e.g., via a sensor arm 1202) may be positioned to contact the first target zone 1207 of the user. In some embodiments, sensors configured to measure the position and activity of the user's tongue may be supported at the first target zone 1207 by the sensor arm. In some embodiments, accelerometers configured to measure movement of the user's face may be placed at the first target zone 1207.

In some embodiments, a second target zone 1208 is shown along the jawline of the user. The second target zone 1208 may include portions of the user's face above and under the chin of the user. The second target zone 1208 may include portions of the user's face under the jawline of the user. The second target zone 1208 may be used to measure electrical signals associated with muscles in the face, lips jaw and neck of the user, including the depressor labii inferioris of the user, the depressor anguli oris of the user, the mentalis of the user, the orbicularis oris of the user, the depressor septi of the user, the mentalis of the user, the platysma of the user and/or the risorius of the user. Various sensor may be placed at the second target zone 1208. For example, electrodes (e.g., 1204 in FIG. 6A) supported by the wearable device 1200 (e.g., via a sensor arm 1202) may be positioned to contact the second target zone 1208. Additional sensors, e.g., accelerometers, may be supported by the wearable device and positioned at the second target zone 1208 to measure the movement of the user's jaw. Additional sensor may also include sensors configured to detect the position and activity of the user's tongue.

In some embodiments, a third target zone 1209 is shown at the neck of the user. The third target zone 1209 may be used to measure electrical signals associated with muscles in the neck of the user, e.g., the sternal head of sternocleidomastoid of the user, or the clavicular head of sternocleidomastoid. Various sensors may be positioned at the third target zone 1209. For example, accelerometers may be supported at the third target zone to measure vibrations and movement generated by the user's glottis during speech, as well as other vibrations and motion at the neck of user 1230 produced during speech.

In some embodiments, a reference zone 1210 may be located behind the ear of the user at the mastoid of the user. In some embodiments, reference electrodes (e.g., 1203 in FIG. 6A) may be positioned to contact the reference zone 1210 to supply a reference voltage to the face of the user, as discussed herein. Reference zone 1210 may also include portions of the user's head behind and above the ear of the user.

With reference to FIGS. 6A and 6B, as discussed with reference to multiple target zones for measuring the user's speech muscle activation patterns associated with the user speaking, the wearable device 1200 may include various mechanisms to adjust the positions of sensors for accommodating one or more target zones. For example, the sensor arm (e.g., 1202) of the wearable device 1200 may be adjustable along the axis of the sensor arm to enable the electrodes (e.g., 1204 in FIG. 6A) on the sensor arm to align with a target zone. In some embodiments, one or more parts of the wearable device 1200 may be moveable laterally, for example, to enable the sensor(s) thereon to be closer or further away from the user's body part (e.g., face or neck). In some embodiments, the wearable device 1200 may include multiple sensor arms wearable on both sides of the face to enable multiple sets of sensors on either or both sides of the face or neck. It is appreciated that other suitable configurations may be possible to enable any sensors to be suitably positioned in respective target zones.

Figure 7:
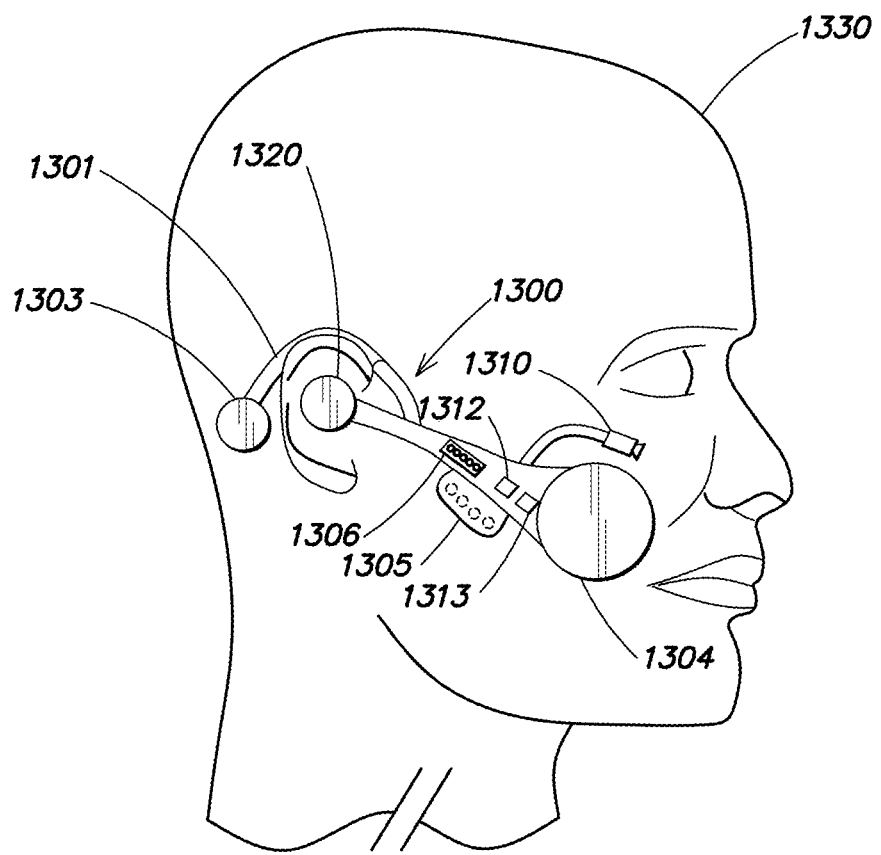
FIG. 7 is a view of a wearable speech input device with a camera integrated into the sensor arm, in accordance with some embodiments of the technology described herein.

FIG. 7 is a view of a wearable speech input device 1300 with a camera integrated into the sensor arm, in accordance with some embodiments of the technology described herein. Wearable device 1300 may be similar in structure to wearable device 1200 (FIG. 6A) and have similar components. For example, wearable device 1300 may include a sensor arm 1302, ear hook 1301, speaker 1320, one or more inputs 1306, one or more sensors 1305, one or more electrodes 1304, reference electrodes 1303, one or more processors 1312, and optionally a speech model 1313, where these components are similar to the components with numerals alike in FIG. 6A. In some embodiments, FIG. 7 may additionally include one or more cameras 1310 supported by the sensor arm 1302, where the one or more cameras are configured to record video of the mouth of the user when the user is speaking, or the environment (e.g., office, a public site) in which the user is when the user is speaking.

In non-limiting examples, the one or more cameras may include a first camera 1310 directed towards the face of the user. The camera 1310 may be supported by sensor arm 1302. The camera 1310 directed towards the face of the user may be used to record video of the mouth of the user. The video of the mouth of the user may be used in determining the one or more output words or phrases from the speech signals recorded by the wearable device 1300. For example, a computer vision machine learning model may be trained to determine words or phrases from videos of a user speaking. The computer vision machine learning model may be maintained on the wearable device 1300, on a connected external device or on a cloud computer server accessible by the wearable device 1300 or the connected external device. The video signals recorded from the camera 1300 directed towards the face of the user may be processed with other speech signals as discussed herein.

In some embodiments, the wearable device 1300 may also support a camera directed towards the environment of the user 1330 (e.g., an office, a public site such as a park, on a train or bus, in a store, in a bank, at an airport etc.). Video signals of the environment of the user may be processed as discussed herein to provide context of the user's speech. In some embodiment, the context may be provided to an application with which the speech input device is communicating to enhance the output of the application. In non-limiting examples as described above and further herein, the application may be a user interaction system configured to provide the text prompt or encoded features from the speech input device to a knowledge system to take actions or generate responses. The user interaction system may use the context information (e.g., the environment in which the user is speaking) to further improve the accuracy of the knowledge system.

Figure 8:
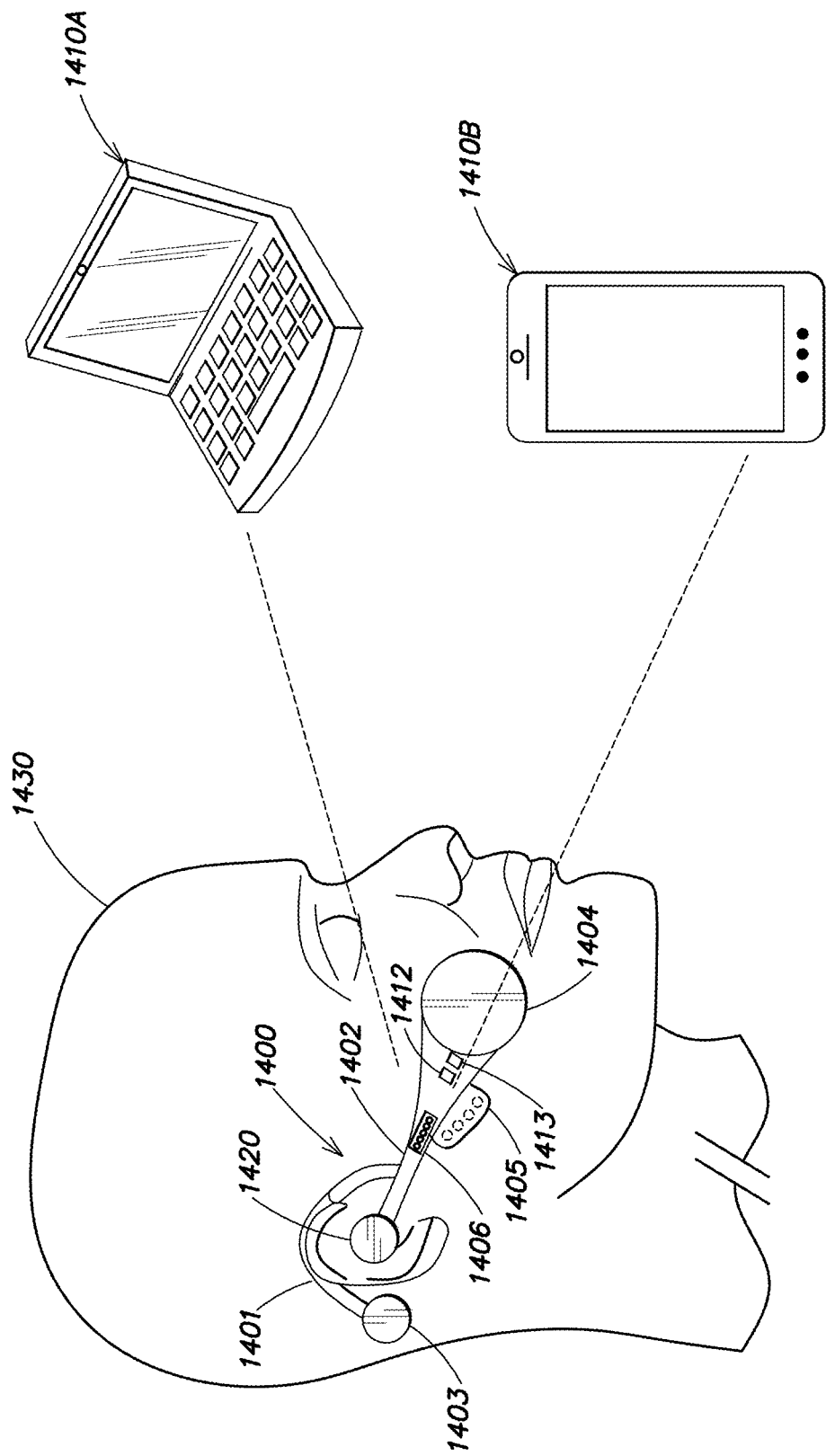
FIG. 8 illustrates a system in which a wearable speech input device is in communication with an external device, in accordance with some embodiments of the technology described herein.

FIG. 8 illustrates a system in which a wearable speech input device 1400 is in communication with an external device, in accordance with some embodiments of the technology described herein. Wearable device 1400 may be similar in structure to wearable devices 1200, 1300 (FIGS. 6A, 7) and have similar components, such as sensor arm 1402, ear hook 1401, speaker 1420, one or more inputs 1406, one or more sensors 1405, one or more electrodes 1404, reference electrodes 1403, one or more processors 1412, and optionally a speech model 1413, all of which are similar to the components with numerals alike in FIGS. 6A and 7. In some embodiments, wearable device 1400 may be configured to be in communication with one or more external devices, e.g., 1410A, 1410B, where the combination of the wearable device 1400 and the external devices 1410 may enable any suitable system that utilizes the silent speech from the wearable device.

In some embodiments, wearable device 1400 may record silent and/or voiced speech signals of the user from the one or more sensors and transmit the text or encoded features of the user's speech (e.g., obtained from a speech model on the wearable device) to the external device, where the wearable device 1400 has a build-in speech model such as in the embodiment in FIG. 5A. Alternatively, and/or additionally, the wearable device 1400 may record silent and/or voiced speech signals of the user from the one or more sensors and transmit the signals (sensor data) to the external device, where the external device has a speech model to predict text or encoded features using the sensor data, and further provide the predicted text or encoded features to an application to take one or more actions. For example, the external device 1410A or 1410B may use the text or encoded features from the user's speech (e.g., via the speech model) to control one or more aspects of the connected the external device 1410A or 1410B. For example, the signals obtained from the one or more sensors (e.g., 1411, 1406) associated with the user's speech may be used to control a user interface of the connected external device, to control an application of the device, to provide an input to the device, to retrieve information from the device or to access or control one or more additional functions of the device, as discussed herein.

Figure 9:
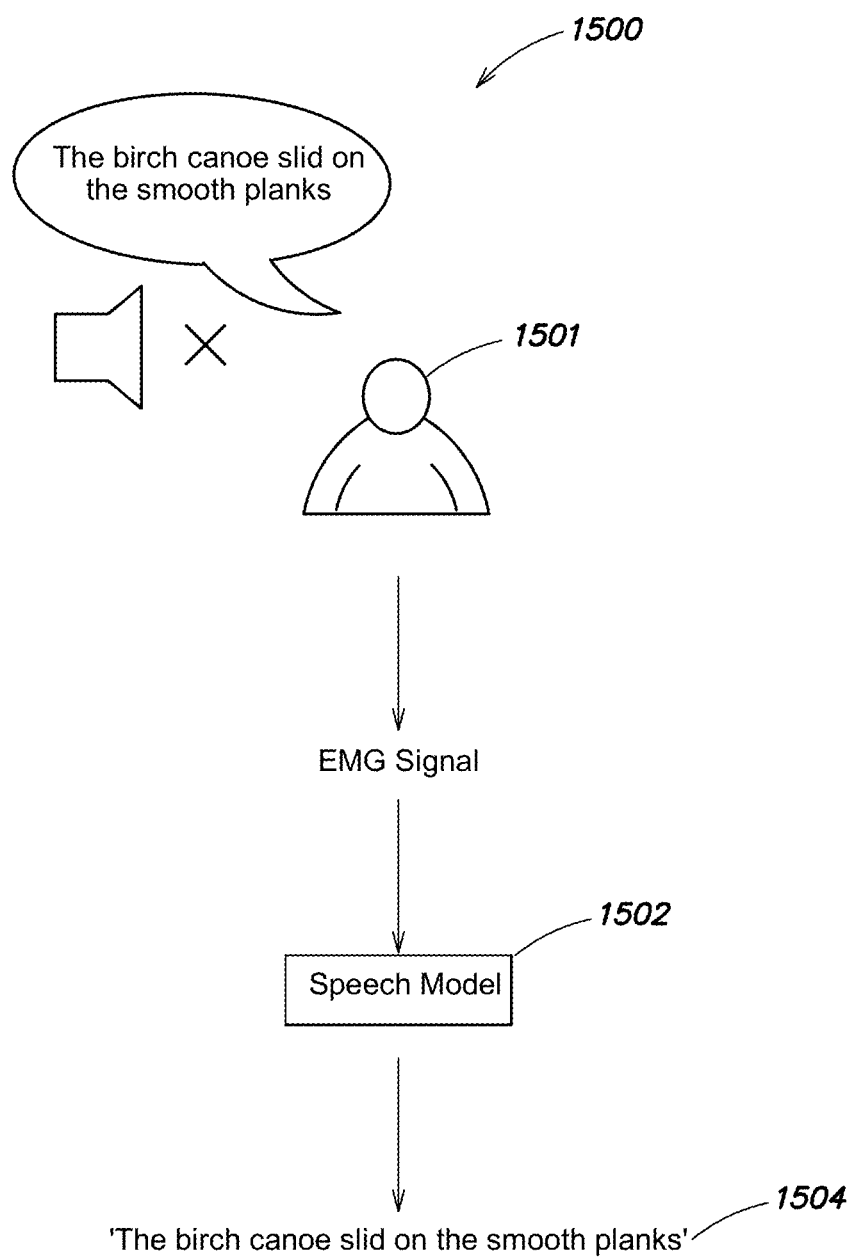
FIG. 9 is a scheme diagram of a speech model configured to decode speech to predict text using EMG signals, in accordance with some embodiments of the technology described herein.

FIG. 9 is a scheme diagram of a speech model configured to decode speech to predict text or encoded features using EMG signals, in accordance with some embodiments of the technology described herein. In some embodiments, the speech model 1502 may be trained and installed in a speech input device (e.g., 1000 in FIG. 4A, 1100 in FIG. 5A, 1200 in FIG. 6A, 1300 in FIG. 7, 1400 in FIG. 8). Alternatively, the speech model 1502 may be installed in an external device (e.g., 1050 in FIG. 4A, 1410A, 1410B in FIG. 8). When deployed (for inference), the speech model 1502 may be configured to receive sensor data indicative of the user's speech muscle activation patterns (e.g., EMG signals) associated with the user's speech (voiced or silent) and use the sensor data to predict text or encoded features. As shown in FIG. 9, the user speaks silently "The birch canoe slid on the smooth planks." The speech model 1502 receives the EMG signals associated with the user's speech, where the EMG signals indicate the speech muscle activation patterns as discussed above and further herein. The speech model 1502 outputs the text "The birch canoe slid on the smooth planks."

In some embodiments, the sensor data indicating the user's speech muscle activation patterns, e.g., EMG signals, may be collected using a speech device such as shown and described in embodiments in FIGS. 4A, 5A, 6A, 7, and 8. The speech model 1502 may be trained to use the sensor data to predict text or encoded features. Although it is shown that the EMG signals is associated with the user speaking silently, it is appreciated that the EMG signals may also be associated with the user speaking loudly, or in whisper, and may be used train the speech model to predict the text or encoded features. Thus, domain of the signals used for inference (target domain) and the domain for signals for training the speech model (source domain) may vary, as will be further described.

In some embodiments, training data for the speech model 1502 may be associated with a source domain (collection domain). In some embodiments, the source domain may be a voiced domain, where the signals indicating the user's speech muscle activation patterns are collected from voiced speech of training subject(s). In some embodiments, the source domain may be a whispered domain, where the signals indicating the user's speech muscle activation patterns are collected from whispered speech of training subject(s). In some embodiments, the source domain may be a silent domain, where the signals indicating the user's speech muscle activation patterns are collected from silent speech of training subject(s).

As described herein in the present disclosure, voiced (vocal) speech may refer to a vocal mode of phonation in which the vocal cords vibrate during at least part of the speech for vocal phonemes, creating audible turbulence during speech. In a non-limiting example, vocal speech may have a volume above a volume threshold (e.g., 40 dB when measured 10 cm from the user's mouth). In some examples, silent speech may refer to unvoiced mode of phonation in which the vocal cords are abducted so that they do not vibrate, and no audible turbulence is created during speech. Silent speech may occur at least in part while the user is inhaling, and/or exhaling. Silent speech may occur in a minimally articulated manner, for example, with visible movement of the speech articulator muscles, or with limited to no visible movement, even if some muscles such as the tongue are contracting. In a non-limiting example, silent speech have a volume below a volume threshold (e.g., 30 dB when measured about 10 cm from the user's mouth). In some examples, whispered speech may refer to unvoiced mode of phonation in which the vocal cords are abducted so that they do not vibrate, where air passes between the arytenoid cartilages to create audible turbulence during speech.

In some embodiments, the target domain (e.g., a domain used for inference) may preferably be silent domain. In some embodiments, the target domain may be whispered domain. It is appreciated, that the target domain may also be voiced domain or any other domain. In some embodiments, the source domain may be voiced domain, whispered domain, silent domain, or a combination thereof. For example, the training data for the speech model may be collected from both voiced speech and silent speech, each contributing to a respective portion of the training data.

Figure 10:
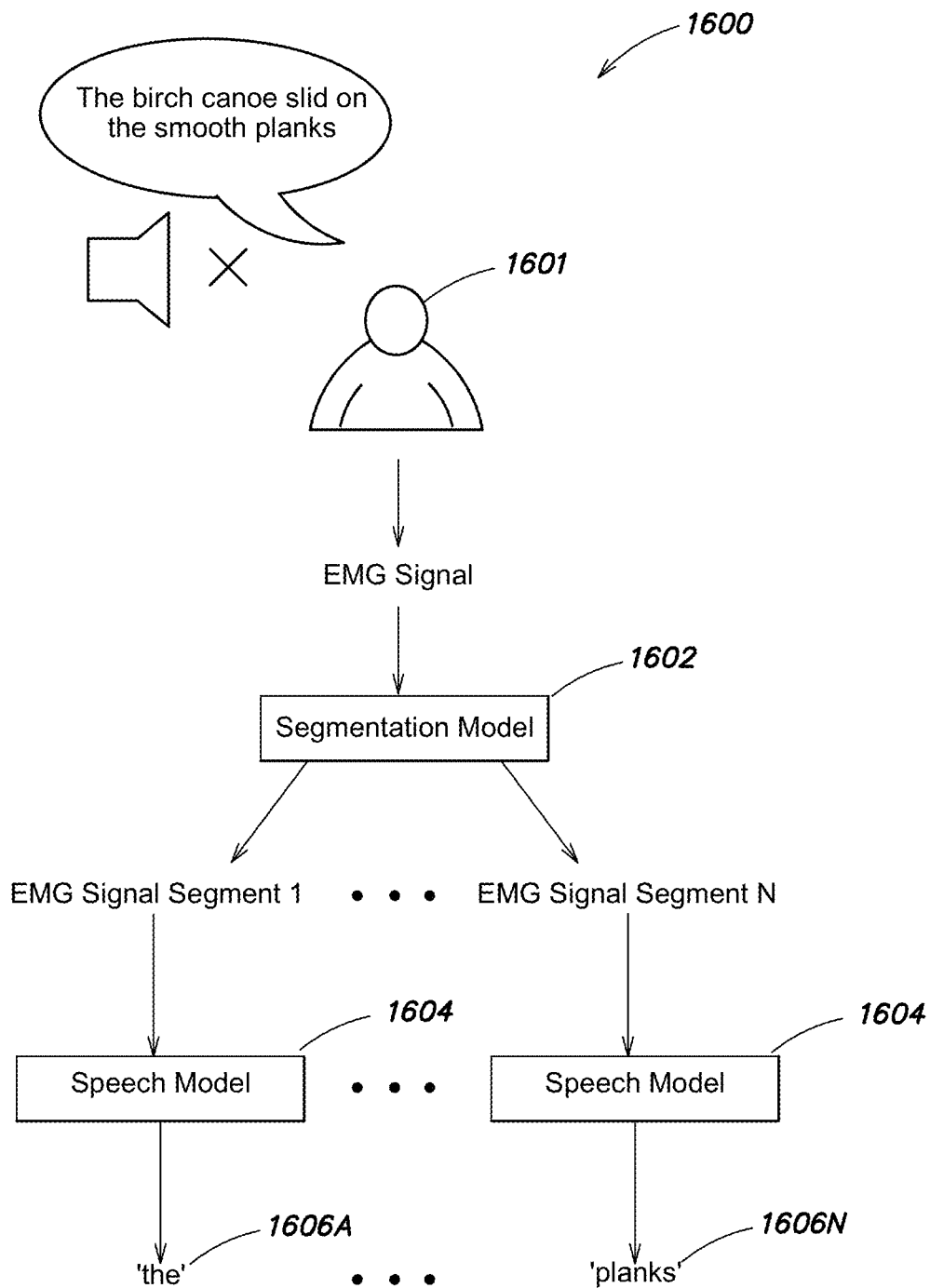
FIG. 10 is a scheme diagram of a speech model configured to decode speech to predict text using EMG signal and segmentation of the EMG signals, in accordance with some embodiments of the technology described herein.

FIG. 10 is a scheme diagram of a speech model 1604 configured to decode speech to predict text or encoded features using EMG signals and segmentation of the EMG signals, in accordance with some embodiments of the technology described herein. As shown, FIG. 10 is similar to FIG. 9 with a difference in that the signals indicating the user's speech muscle activation patterns (e.g., EMG signals) are segmented by a segmentation model 1602 before being provided to the speech model 1604. In the example shown, the EMG signals are segmented into a number of segments (e.g., 1, 2, . . . , N). These EMG signal segments are provided to the speech model 1604, which is configured to output the text corresponding to each of the EMG signal segments. In some embodiments, the EMG signals are segmented by word, for example, the speech "The birch canoe slid on the smooth planks" is segmented by eight segments each corresponding to a respective word in the speech. As shown, the speech model 1604 may output eight words each corresponding to a respective EMG signal segment. Although it is shown that segmentation model 1602 segments the EMG signals by word, it is appreciated that the segmentation model may also be trained to segment the EMG signals in any other suitable manner, where each segment may correspond to a phoneme, a syllabus, a phrase, or any other suitable segment unit. Accordingly, the speech model 1604 may be trained to predict text that corresponds to a signal segment (e.g., EMG signal segment), where a segment may correspond to a segmentation unit, e.g., a sentence, a phrase, a word, a syllable etc. In some embodiments, training a speech model (e.g., 1604) for predicting text segments may including generating segmented training data, the details of which are further described with respect to FIG. 11.

Figure 11:
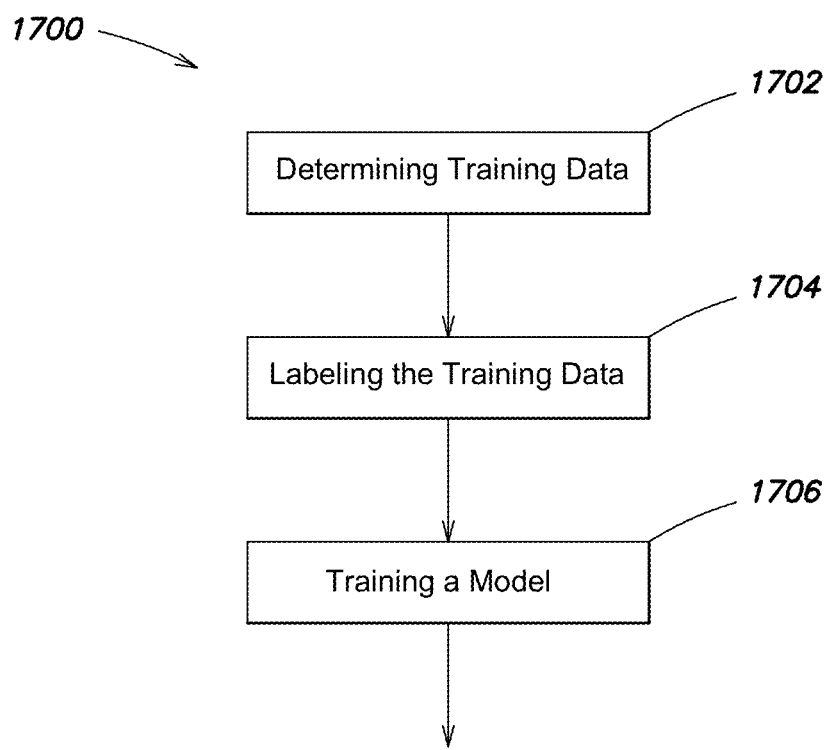
FIG. 11 is a flow diagram of an example process for training a speech model, in accordance with some embodiments of the technology described herein.

FIG. 11 is a flow diagram of an example process 1700 for training a speech model, in accordance with some embodiments of the technology described herein. As described herein (e.g., with reference to FIGS. 4A, 5A, 6A, 7, and 8), the speech model being trained may be embedded in a speech input device or in an external device external to the speech input device. In some embodiments, training process 1700 may include determining training data at act 702, labeling the training data at act 704, and using the labeled training data to train a model at act 706. These acts are further described in detail.

In some embodiments, act 702 may be performed for an individual user, for a group of users, for one or more collection domains (as described above and further herein), and/or otherwise performed. In some embodiments, training data may be generated in one or more sampling contexts at act 702. A sampling context may refer to an environment in which the training data is generated. For example, a sampling context may include the training subject being presented with a prompt (e.g., in a data collection center), and speaking the prompt in the source (collection) domain (e.g., voiced, whispered, silent, etc.). The prompt may be text (e.g., a script), audio prompt, and/or any other prompt. In some embodiments, a training system may output the prompt (e.g., display a phrase on a screen, or play an audio prompt in an audio device) to a training subject and ask the training subject to repeat the phrase using voiced speech, whispered speech, and/or silent speech.

In non-limiting examples, the training system may ask the training subject to use voiced speech in one or more voiced speech trials, to use silent speech in one or more silent speech trials, and/or to use whispered speech in one or more whispered speech trials, where each trial corresponds to a single prompt or a set of prompts. In some embodiments, voiced speech trials may be arranged between sets of silent speech trials. For example, a voiced speech trial may be used every K silent speech trials, where K may be in a range of 1-1000, or 5-100, or may be in a range greater than a threshold value, e.g., greater than 1000.

In some embodiments, the training system may provide auditory feedback to improve the accuracy of training data collection, training data labeling, and/or otherwise improve the model training. For example, the auditory feedback may include voice converted from the inferred text from the silent or whispered speech, where the training system may play back the auditory feedback to the training subject during the training data collection.

In some embodiments, prompts in collecting the training data may be segmented. For example, the training subject and/or another person may optionally delineate the start and/or end of each: prompt, sentence within the prompt, word within the prompt, syllable within the prompt, and/or any other segment of the prompt. Additionally and/or alternatively, auxiliary measurements (e.g., video of the training subject while speaking, inertial measurements, audio, etc.) sampled during test subject speaking may be used to determine the prompt segmentation (e.g., each segment's start and end timestamps).

In some embodiments, a sampling context for generating training data may not include a prompt. Rather, training data may be collected during spontaneous speech. For example, the training data is sampled when the training subject may speak (e.g., voiced, whispered, silent, etc.) and/or perform other actions in their usual environment (e.g., attending meetings, taking phone calls, etc.). In such context, background training data can be collected, where the background training data includes user's speech responsive to operation mode selection by the user (e.g., turning on the device, user indication to interpret the signals, etc.) and/or without operation mode selection by the user (e.g., continuous data collection, automatic data collection responsive to a sensed event, etc.). In some embodiments, background training data collected without explicit prompts may enable training and/or calibrating a personalized speech model, training and/or calibrating a continual (e.g., outside of data collection centers; while all or parts of the system are not in active use for silent speech decoding and/or for controlling a device based on decoded silent speech; etc.), decreasing silent speech decoding errors, and/or providing other advantages.

In some embodiments, sampling context for generating training data may include other scenarios, e.g., the user's action associated with speaking. For example, the sampling context may include user sitting, walking, jumping up and down, or taking other actions when speaking.

In some embodiments, training data may be collected by using one or more measurement systems containing one or more sensors such as described herein (see FIGS. 4A, 5A, 6A, 7, 8, for example). In some embodiments, the measurement systems may include an electrophysiology measurement system including one or more sensors configured to captured one or more types of signals that indicate the user speech muscle activation patterns associated with the user's speech, e.g., EMG signals, EEG signals, EOG signals, ECG signals, EKG signals, etc. or other suitable biometric measurement systems. In some embodiments, the measure systems may include one or more of: motion sensor (e.g., IMU), microphone, optical sensors configured to detect the movement of the user's skin (e.g., infrared cameras with a dot matrix projector), video cameras configured to capture images, videos, motion capture data, etc., sensors configured to detect blood flow (e.g., PPG, fNIRS), thermal cameras, depth/distance sensors (e.g., ToF sensors), and/or any other measurement systems. Data collected from a measurement system can correspond to a measurement modality.

In some embodiments, EMG sensors may be placed on a training subject to capture the training data. For example, EMG sensors may be placed at or near any target zones, such as shown in FIG. 6B. For example, EMG sensors may be placed on and/or under the jaw, on the cheek, at and/or below the cheek bone, at and/or near the temporomandibular joint, and/or any other location on the face. In some embodiments, the EMG sensors may be positioned more than a threshold distance away from the face midline. The threshold distance may be between 2 cm-15 cm or any range or value therebetween, but can alternatively be less than 2 cm or greater than 15 cm. As such, EMG sensors may be less intrusive and/or more ergonomic. In some embodiments, EMG sensors may optionally be positioned on only one side of the user's face or on both sides of the face. The number of EMG sensors may be between 2-100 or in any range or value therebetween (e.g., 5-20), but can alternatively be less than 2 or greater than 100. During inference, EMG sensors may be placed in a similar region as they are placed in collecting the training data during training.

In some embodiments, training data may be synthetically generated. In some embodiments, training data captured in one domain may be used to generate training data in another domain. For example, synthetic silent domain measurements may be generated by sampling voiced domain measurements and subtracting the glottal vibrations (e.g., determined using an accelerometer, a microphone, etc.). In another example, a model may be trained to generate synthetic silent domain measurements based on voiced domain measurements (e.g., using paired silent and voiced measurements for the same training subject, for the same prompt, etc.). For example, the model can be trained using generative and/or de-noising methods (e.g., Stable Diffusion).

In some embodiments, a relationship between sets of source domain training data generated in different sampling contexts may be used to augment target domain training data. For example, voiced speech training data may include paired examples of a training subject using voiced speech across two or more sampling contexts (e.g., sitting, walking, jumping up and down, other actions, etc.). A mapping function may be inferred between two sampling contexts (e.g., sitting to walking), where the mapping function can be applied to silent speech training data sampled in the first sampling context to generate synthetic silent speech training data in the second sampling context. In some embodiments, synthetic training data may be generated by introducing artifacts and/or otherwise altering sampled training data.

With further reference to FIG. 11, act 704 may be performed to pair the training data with speech labels, where the training data may be indicative of a training subject's speech muscle activation patterns associated with the subject speaking (e.g., EMG measurements). Speech labels may include text, audio, word segmentation, phrase segmentation, intonation, and/or any other speech information associated with the training data. In some embodiments, a speech label may include a prompt (e.g., text from a prompt that was used for the training system to prompt the user to speak and thus collect training data). In some embodiments, a speech label may include text and/or audio determined based on ground truth measurements taken when the training data is being collected. Ground truth measurements may include sensor data associated with training data collection. For example, ground truth measurements may include: audio, video, motion data, and/or any sensor data captured from other measurement modalities. In some embodiments, ground truth measurements may be collected in a ground truth measurement system. A ground truth measurement system may include: a microphone, a video camera, and/or one or more sensors as described above with respect to a speech input device (e.g., FIGS. 4A, 5A, 6A, 7, and 8) or any other suitable measurement devices.

In some examples, ground truth audio signals (e.g., captured from a microphone or a video camera) may be converted to a text speech label (e.g., using ASR or converted manually). In other examples, ground truth videos may be converted to a text speech label (e.g., using automated lip reading or converted manually). For example, facial kinematics may be extracted from a ground truth video of a training subject when speaking during the training data collection. Lip reading may use the extracted facial kinematics to convert the video to a text speech label. Additionally, and/or alternatively, ground truth measurements may be used to validate, correct, and/or otherwise adjust another speech label. For example, a speech label including a prompt text may be corrected based on a ground truth measurement as will be further described in detail with reference to FIG. 12.

Figure 12:
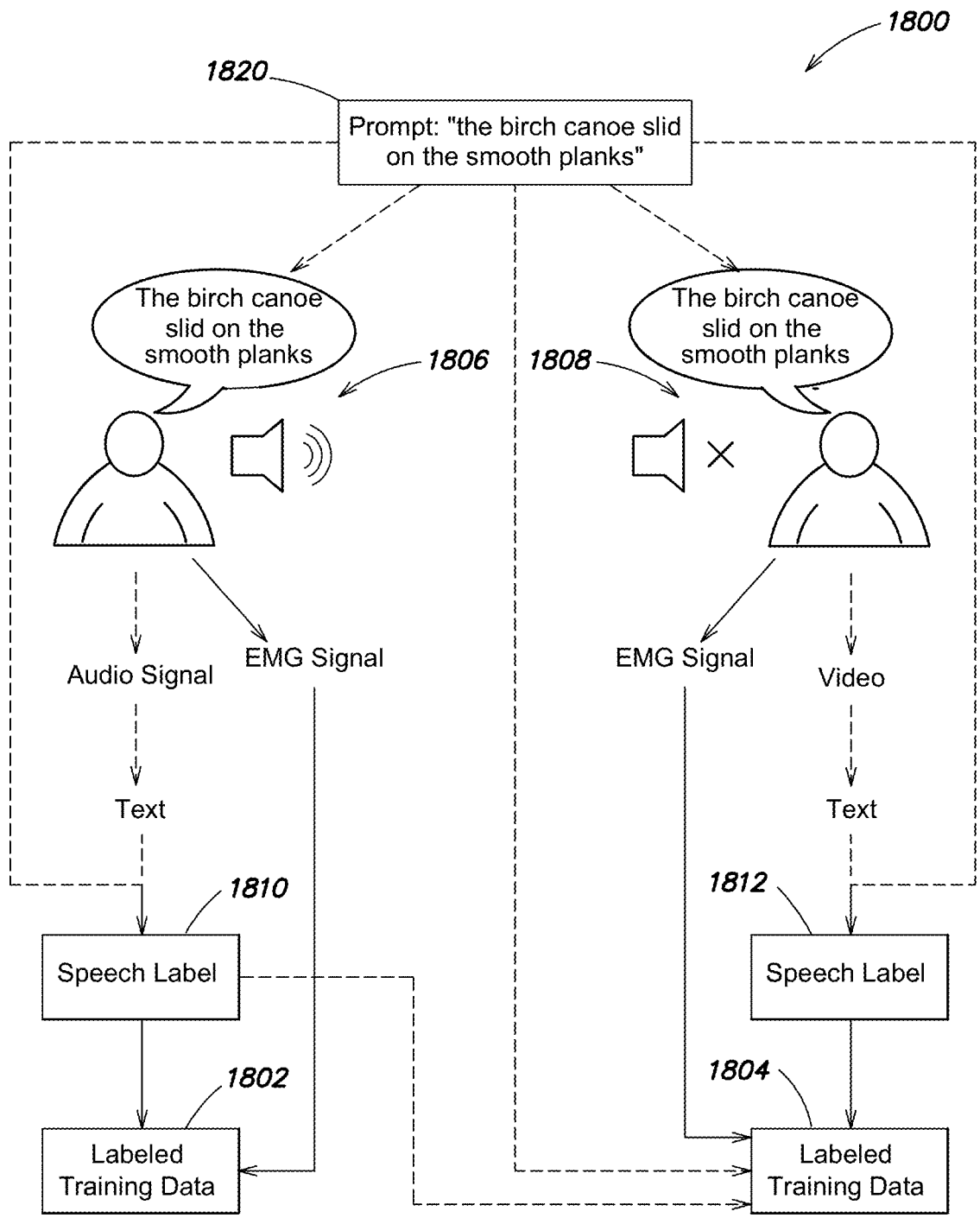
FIG. 12 is a scheme diagram of generating labeled training data for a speech model using different types of measurements to generate speech labels for the labeled training data, in accordance with some embodiments of the technology described herein.

FIG. 12 is a scheme diagram of generating labeled training data for a speech model using different types of measurements to generate speech labels for the labeled training data, in accordance with some embodiments of the technology described herein. Labeled training data may include paired training data and speech labels as described above and further herein. In some embodiments, in generating the labeled training data, a speech label associated with training data may be predetermined. For example, the speech label may include a prompt that was used to prompt the user to speak when collecting the training data. In some embodiments, in generating the labeled training data, speech labels associated with training data may be determined using ground truth measurements sampled concurrently with the training data, where the training data (e.g., EMG signals indicating a user's speech muscle activation patterns) and the speech labels may be generated from the same or different domains.

As shown in FIG. 12, labeled training data 1802 and labeled training data 1804 are generated respectively in a voiced domain 1806 (in which the user speaks in a voiced speech) and a silent domain 1808 (in which the user speaks silently). In the voiced domain 1806, the user is prompted with text 1820 and the user speaks the prompt in a voiced speech. EMG signals are collected (e.g., using any of the modalities as described above and further herein) while the user is speaking in the voiced speech. Ground truth audio signal collected from the user speaking may be converted (e.g., using ASR) to a text speech label 1810 to generate the labeled training data 1802. In the silent domain 1808, the user speaks the prompt in a silent speech. EMG signals are collected (e.g., using any of the modalities as described above and further herein) while the user is speaking silently. Ground truth video collected from the user speaking may be converted (e.g., using lip reading as described herein) to a text speech label 1812 to generate the labeled training data 1804.

In some embodiments, labeled training data generated in one domain may be corrected by ground truth measurements collected in another domain. For example, as shown in FIG. 12, labeled training data 1804 generated from the speech label in the silent domain 1808 may be corrected by the speech label 1810 that was generated using the ground truth measurements collected in the voiced domain 1806. In other variations, labeled training data 1802 may be generated from the speech label 1810 in the voiced domain and corrected from the speech label 1812 generated in the silent domain.

Returning to FIG. 11, labeling the training data at act 704 may include temporally align the speech labels to the training data. For example, the training data may be segmented (e.g., into sentences, phrases, words, syllables, etc.), wherein each training data segment is aligned to a respective speech label. In some embodiments, the training data may be segmented (e.g., manually or automatically) after the training data is collected. In some embodiments, the training data may be segmented while being collected. For example, the subject providing the speech training data or another person may manually segment the data while being collected. In some embodiments, the training data may be segmented (during or after the data collection) using measurements acquired during the training data collection. For example, the measurement acquired during the training data collection may include information indicative of the start/end time of each training data segment, details of which are further described.

In non-limiting examples, automatic speech recognition (ASR) may be used on sampled speech audio to detect the start/end time for each voiced segment (e.g., word, phrase, etc.), where the start/end time for each voiced segment may be used to determine the training data segment (e.g., EMG measurement) associated with the voiced segment. The ASR may be used concurrently while the speech audio is sampled. Alternatively, the ASR may be used after the speech audio is collected. In other non-limiting examples, lip reading (e.g., extracting facial kinematics from videos captured during the user speaking) may be used to detect the start/end time for each training data segment. The video may be captured using a speech input device having a camera, e.g., wearable device 1300 having a camera 1310 on the sensor arm (FIG. 7).

It is appreciated that the video may be captured in any other suitable manner, for example, from a camera on a desktop computer facing the user while the user is speaking. In other non-limiting examples, pause detection may be used to detect the start/end time of a training data segment. Pause detection may be applied to sensor data (e.g., speech audio from a microphone, EMG data from an EMG sensor, sensor data from an inertial sensor, etc. collected during a user's speech) to delineate a start/end time of a training data segment. It is appreciated that, the training data segments, which are temporally aligned with speech labels, may be used to train the speech model to predict text from segmented signals associated with user speaking (e.g., EMG signals), such as described in embodiments in FIG. 10.

Although embodiments are described for training a speech model using segmented training data, it is appreciated that segmentation of training data may be optional. For example, the speech label may be a text prompt of a phrase, where the training data associated with the user speaking (e.g., voiced, whispered, silently, etc.) may be labeled with the entire text prompt.

With further reference to FIG. 11, at act 706, the speech model may be trained iteratively using self-supervised learning, semi-supervised learning, supervised learning, unsupervised learning, transfer learning, reinforcement learning, and/or any other suitable training method. In training the speech model, the training data may include target domain training data and/or source domain training data as described herein, e.g., in embodiments of FIG. 11. Target domain training data refers to data collected in the domain in which signals are used in inference, where source domain training data refers to data collected in the domain in which signals are used in training the speech model. Various methods may be used to process the target domain training data and source domain training data, the details of which are further described with reference to FIG. 13.

Figure 13:
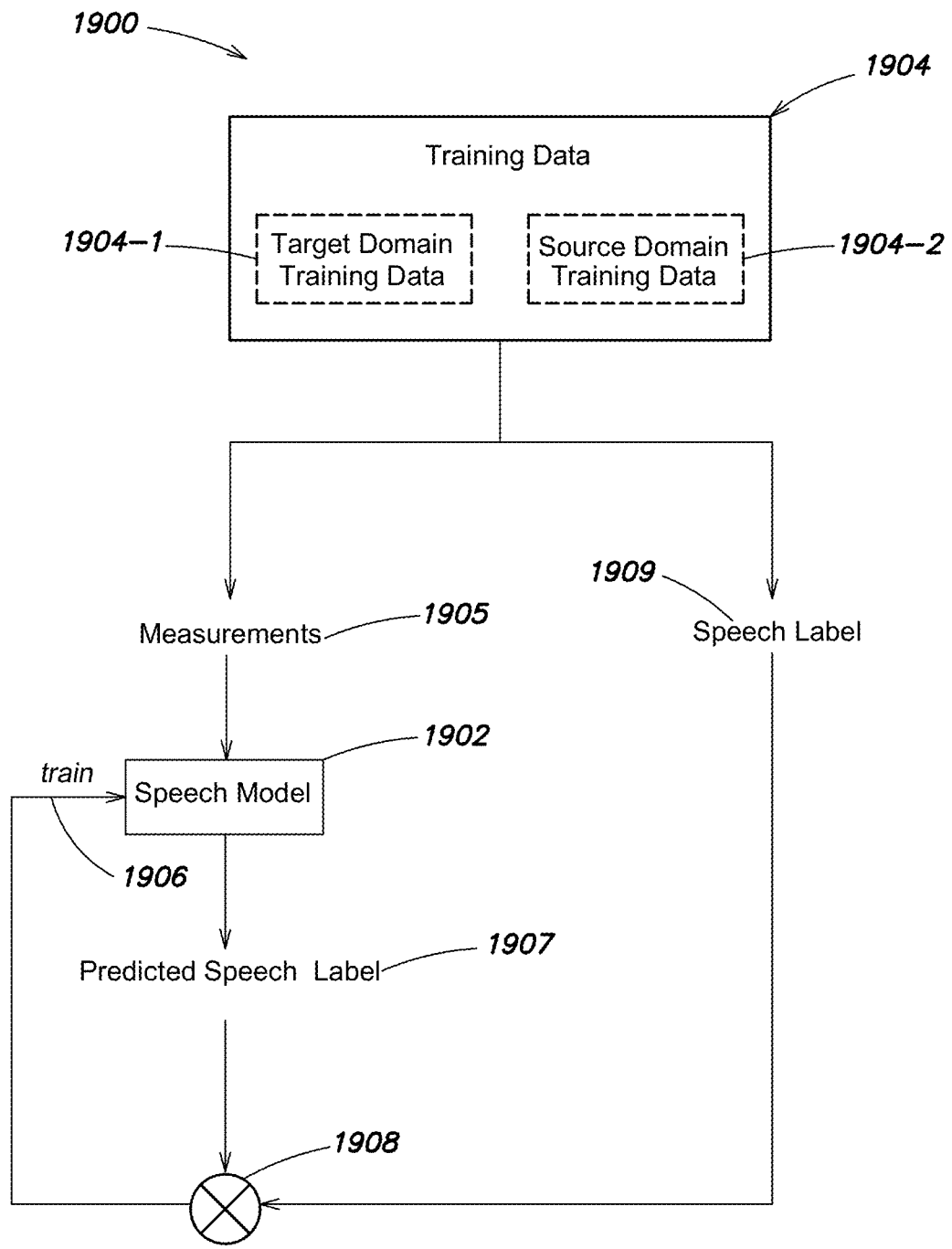
FIG. 13 is a scheme diagram of training a speech model using training data collected in different domains, in accordance with some embodiments of the technology described herein.

FIG. 13 is a scheme diagram 1900 of training a speech model using training data collected in different domains, in accordance with some embodiments of the technology described herein. The speech model 1902 may be trained using a combination of target domain training data and source domain training data 1904, where the target domain training data and the source domain training data may be combined in different manners. In some embodiments, the training data 1904 may include randomly shuffling source domain training data 1904-2 and target domain training data 1904-1. In some embodiments, the speech model 1902 may be initially trained using source domain training data (e.g., only source domain training data, above a threshold proportion of source domain training data, etc.). In subsequent training iterations, an increased proportion of target domain training data may be used. In other embodiments, the speech model 1902 may be initially trained using source domain training data, and subsequently, the speech model 1902 may be tuned using target domain training data. It is appreciated that the target domain training and source domain training data may be combined in other suitable manners.

Although embodiments of dividing training data into target domain training data and source domain training data are shown in FIG. 13, in other variations, the speech model may optionally be trained using training data that includes different measurement modalities such as described above and further herein. In some embodiments, a subset of the modalities may be selected (e.g., for a training iteration, for a set of measurements, for a training subject, etc.). For example, the speech model may be initially trained using audio signals and EMG signals labeled with speech labels. In subsequent training iterations, only EMG signals and no audio signals are used.

Figure 14:
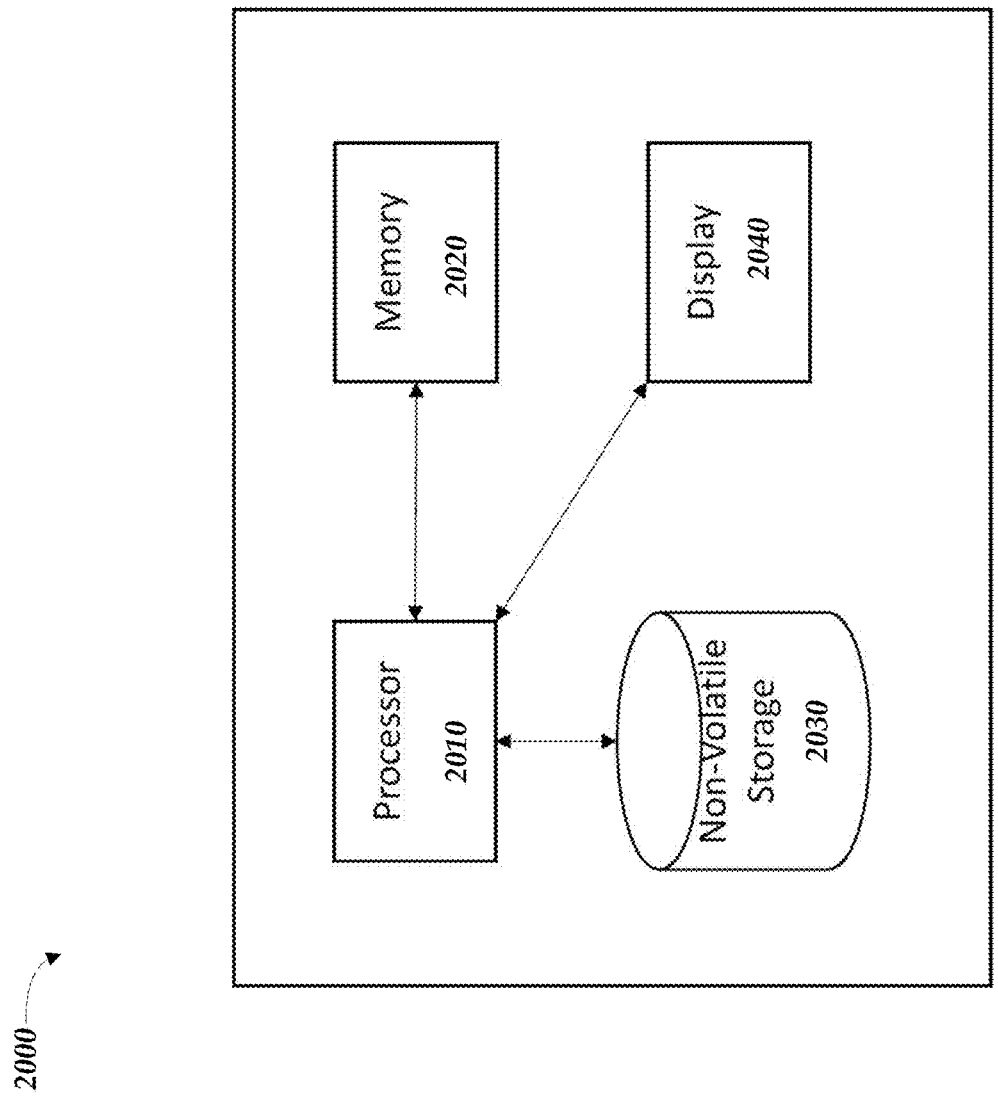
FIG. 14 shows an illustrative implementation of a computer system that may be used to perform any of the aspects of the techniques and embodiments disclosed herein, according to some embodiments.

An illustrative implementation of a computer system 2000 that may be used to perform any of the aspects of the techniques and embodiments disclosed herein is shown in FIG. 14. For example, the computer system 2000 may be installed in system 100 of FIG. 1. The computer system 2000 may be configured to implement various embodiments in FIG. 1, e.g., speech model 106, knowledge system 104, or any application 128, or various processes/acts in FIGS. 2-13. The computer system 2000 may include one or more processors 2010 and one or more non-transitory computer-readable storage media (e.g., memory 2020 and one or more non-volatile storage media 2030) and a display 2040. The processor 2010 may control writing data to and reading data from the memory 2020 and the non-volatile storage device 2030 in any suitable manner, as the aspects of the invention described herein are not limited in this respect. To perform functionality and/or techniques described herein, the processor 2010 may execute one or more instructions stored in one or more computer-readable storage media (e.g., the memory 2020, storage media, etc.), which may serve as non-transitory computer-readable storage media storing instructions for execution by the processor 2010.

In connection with techniques described herein, the one or more processors 2010 may be configured to implement various embodiments described in FIGS. 1-13. For example, the one or more processors 2010 may be part of a computer system (e.g., 100 in FIG. 1) or any components thereof, or a speech input device (e.g., 110 in FIG. 1). The knowledge system 104 may be running on the speech input device (e.g., 110 in FIG. 1), on a mobile device, on a desktop PC, on another companion/relay device, on the cloud, or any other suitable platform. The one or more processors may include a DSP, a secondary computing device, a phone processor, a tensor processor, a laptop or desktop computing device, and/or a cloud computing instance (e.g., a virtual machine).

In connection with techniques described herein, code used to, for example, generate a prompt from silent speech, use the knowledge system to take an action or generate a response may be stored on one or more computer-readable storage media of computer system 2000. Processor 2010 may execute any such code to provide any techniques for generate a prompt, taking an action or generating a response as described herein. Any other software, programs or instructions described herein may also be stored and executed by computer system 2000. It will be appreciated that computer code may be applied to any aspects of methods and techniques described herein. For example, computer code may be applied to interact with an operating system to operate the knowledge system through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

Various aspects are described in this disclosure, which include, but are not limited to, the following aspects:

What is claimed is:

1. A user interaction system comprising:
   a wearable speech input device configured to measure a signal indicative of a user's speech muscle activation patterns when the user is speaking; and
   at least one processor configured to:
   use a speech model and the signal as an input to the speech model to generate an output; and
   use a knowledge system to take an action or generate a response based on the output.

2. The system of claim 1, wherein:
   the speech input device includes an electromyography (EMG) sensor; and
   the signal is an EMG signal captured from the EMG sensor when the user is silently speaking or whispering.

3. The system of claim 2, wherein the signal is recorded non-invasively from one or more regions of face and/or neck of the user via a conductive electrode coupled to an electronic amplifier system.

4. The system of claim 2, wherein silently speaking produces a sound volume less than or equal to 30 dB, wherein the sound volume is measured about 10 cm from a mouth of the user.

5. The system of claim 1 further comprising one or more additional sensors configured to measure respective signals when the user is speaking.

6. The system of claim 1, wherein the output of the speech model comprises a text prompt and/or encoded features.

7. The system of claim 6, wherein the text prompt corresponds to one or more words spoken by the user.

8. The system of claim 6, wherein the text prompt includes two or more candidate transcripts of utterance of the user comprising one or more spoken words, wherein the two or more candidate transcripts are generated by the speech model.

9. The system of claim 6, wherein the encoded features include a probability distribution of different text tokens associated with a decoder of the speech model.

10. The system of claim 1 further comprising an output device configured to output the response to a user, wherein outputting comprises one or more of:
    outputting the response in a text format;
    outputting the response in an auditory signal;
    outputting the response in an image format;
    outputting the response in a video format;
    outputting the response in augmented reality; or
    outputting the response in haptics.

11. The system of claim 1, wherein the at least one processor is further configured to:
    determine an application based on the output of the speech model; and
    cause the knowledge system to use the application to take the action or generate the response based on the output of the speech model.

12. The system of claim 11, further comprising a graphical user interface, wherein using the application comprises opening the application on the graphical user interface to receive user input.

13. The system of claim 1, wherein the speech model is trained for predicting speech label in a first domain using at least training data in a second domain different from the first domain.

14. The system of claim 1, wherein the speech model is trained for predicting speech label using voiced speech training data and silent speech training data.

15. The system of claim 14, wherein the knowledge system includes a machine learning foundation model.

16. The system of claim 15, wherein the machine learning foundation model includes a large language model.

17. The system of claim 15, wherein:
    the output of the speech model comprises a text prompt; and
    the machine learning foundation model is configured to use the text prompt as input and generate the response by sampling text from a distribution of possible responses.

18. The system of claim 1, wherein the at least one processor is configured to take the action by:
    causing the knowledge system to use a machine learning foundation model to generate code based on the output of the speech model; and
    executing the code to produce the action.

19. The system of claim 1, wherein the at least one processor is further configured to:
    provide context to the knowledge system; and
    use the knowledge system to take the action or generate the response additionally based on the context.

20. The system of claim 19, wherein the context includes personalized characteristic of the user, a location of the user, a contact list of the user, an address of the user, an email history of the user, a message history of the user, or a combination thereof.

21. The system of claim 1, wherein the action or the response includes prompting the user with a clarifying question.

22. The system of claim 21, wherein the at least one processor is further configured to:
    receive a user input, the user input responsive to the clarifying question;
    use the speech model and the user input to generate a text prompt; and
    use the knowledge system to take additional action or generate additional response based on the text prompt.

23. The system of claim 1, wherein the knowledge system is configured to interact with a message system to:
    generate a message; and
    transmit the message over a communication network and/or output the message on an output device.

24. The system of claim 23, wherein the message system comprises a text messaging system, an instant messaging system, an email system, and/or a voicemail system.

25. The system of claim 24, wherein the at least one processor is further configured to:
    provide context to the knowledge system; and use the knowledge system to interact with the message system to generate the message additionally in combination with the context.

26. The system of claim 25, wherein the context comprises one or more of: a user's prior message history with an intended recipient, or a writing style of a user.

27. The system of claim 1, wherein the knowledge system is configured to interact with one or more applications comprising a search system, a note-taking system, a payment system, a ride-share system, a programming IDE, a web browser, or a combination thereof.

28. A computerized method comprising:
receiving a signal indicative of a user's speech muscle activation patterns when the user is speaking;
using a speech model and the signal as an input to the speech model to generate an output; and
using a knowledge system to take an action or generate a response based on the output.

29. The method of claim 28, wherein receiving the signal indicative of the user's speech muscle activation patterns when the user is speaking comprises:
receiving the signal from a speech input device including an electromyography (EMG) sensor;
wherein the signal is an EMG signal captured from the EMG sensor when the user is silently speaking.

30. A non-transitory computer-readable media comprising instructions that, when executed by one or more processors on a computing device, cause the one or more processors to:
receive a signal indicative of a user's speech muscle activation patterns when the user is speaking;
use a speech model and the signal as an input to the speech model to generate an output; and
use a knowledge system to take an action or generate a response based on the output.

31. The non-transitory computer-readable media of claim 30, wherein receiving the signal indicative of the user's speech muscle activation patterns when the user is speaking comprises:
receiving the signal from a speech input device including an electromyography (EMG) sensor;
wherein the signal is an EMG signal captured from the EMG sensor when the user is silently speaking.

* * * * *